(12) United States Patent
Kuroki et al.

(10) Patent No.: US 7,226,686 B2
(45) Date of Patent: Jun. 5, 2007

(54) FUEL CELL AND METHOD OF MANUFACTURING THE FUEL CELL

(75) Inventors: Yuichi Kuroki, Fujisawa (JP); Yoshihiro Kurano, Fujisawa (JP); Tomohiro Inoue, Fujisawa (JP); Atsushi Oma, Yokohama (JP); Yasuji Ogami, Yokohama (JP); Kazuo Saito, Fujisawa (JP)

(73) Assignees: NOK Corporation, Minato-ku, Tokyo (JP); Kabushiki Kaisha Toshiba, Minato-ku, Tokyo (JP)

( * ) Notice: Subject to any disclaimer, the term of this patent is extended or adjusted under 35 U.S.C. 154(b) by 518 days.

(21) Appl. No.: 10/474,520

(22) PCT Filed: Apr. 23, 2002

(86) PCT No.: PCT/JP02/04038

§ 371 (c)(1),
(2), (4) Date: Oct. 23, 2003

(87) PCT Pub. No.: WO02/089240

PCT Pub. Date: Nov. 7, 2002

(65) Prior Publication Data
US 2004/0137303 A1 Jul. 15, 2004

(30) Foreign Application Priority Data
Apr. 23, 2001 (JP) ............................. 2001-124317

(51) Int. Cl.
H01M 2/08 (2006.01)
H01M 8/10 (2006.01)
H01M 4/94 (2006.01)
B05D 5/12 (2006.01)

(52) U.S. Cl. ........................... 429/35; 429/30; 429/36; 429/42; 429/44; 427/115

(58) Field of Classification Search ..................... None
See application file for complete search history.

(56) References Cited

U.S. PATENT DOCUMENTS 5,464,700 A 11/1995 Steck et al. ................... 429/30

(Continued)

FOREIGN PATENT DOCUMENTS

CA 2102695 4/1998

(Continued)

*Primary Examiner*—Dah-Wei Yuan
*Assistant Examiner*—Karie O'Neill
(74) *Attorney, Agent, or Firm*—Jacobson Holman PLLC

(57) ABSTRACT

In order to prevent an electrolyte membrane from being broken, and make an assembling steps of a cell easy, in a fuel cell provided with a membrane electrode complex in which catalyst layers are respectively arranged on both surfaces of a electrolyte membrane, first and second gas diffusion layers which are arranged on both surfaces of the electrode complex, separators for respectively supplying reaction gas to the first and second gas diffusion layers, and a gasket for sealing the reaction gas, the gasket is formed on a surface of the gas diffusion layer so as to oppose to the separator, at least the gasket forming portion of the gas diffusion layer has a lower void content than the portion in contact with the catalyst layer, and the gasket arranged in the first and second gas diffusion layers is integrally formed at least via a through hole passing through the first and second gas diffusion layers.

9 Claims, 18 Drawing Sheets

U.S. PATENT DOCUMENTS

| | | | |
|---|---|---|---|
| 6,057,054 A * | 5/2000 | Barton et al. | 429/42 |
| 6,066,409 A | 5/2000 | Ronne et al. | 429/39 |
| 6,190,793 B1 | 2/2001 | Barton et al. | 429/34 |
| 6,232,008 B1 | 5/2001 | Wozniczka et al. | 429/39 |
| 7,063,911 B1 * | 6/2006 | Nagai et al. | 429/35 |
| 2001/0019792 A1 | 9/2001 | Wozniczka et al. | 429/38 |

FOREIGN PATENT DOCUMENTS

| | | |
|---|---|---|
| CA | 2243355 | 1/1999 |
| CA | 2243370 | 1/1999 |
| EP | 1018177 B1 | 4/2002 |
| JP | 7-501417 | 2/1995 |
| JP | 7-220742 | 8/1995 |
| JP | 2000-133288 | 5/2000 |
| WO | WO92/22096 | 12/1992 |
| WO | WO99/04446 | 1/1999 |

* cited by examiner

US 7,226,686 B2

FUEL CELL AND METHOD OF MANUFACTURING THE FUEL CELL

This is a nationalization of PCT/JP02/04038 filed Apr. 23, 2002 and published in Japanese.

TECHNICAL FIELD

The present invention relates to a fuel cell and a manufacturing method of the same.

BACKGROUND ART

In conventional, as shown in FIG. 21, there has been known a fuel cell in which an electrolyte membrane 51, catalyst electrodes 52 and 53, gas diffusion layers 54 and 55, separators 56 and 57 and gaskets 58 and 59 are assembled in an illustrated manner. In these constituting parts, the electrolyte membrane 51 constitutes a membrane electrode complex (also called as a reaction electrode portion or an MEA) together with the catalyst electrodes 52 and 53 arranged on both surfaces thereof, and the membrane electrode complex 60 constitutes a UEA 61 together with the gas diffusion layers 54 and 55 arranged on both surfaces thereof. Further, as shown in FIG. 22, a gas communication groove 62 is provided in the separators 56 and 57 in a predetermined plan layout, and a spacer 63 is arranged in this portion in place of the gasket 58 or 59. With respect to the other portions, the gaskets 58 and 59 fixed to the separators 56 and 57 clamp the electrolyte membrane 51 between them so as to secure a sealing property.

However, in accordance with this prior art, since the gaskets 58 and 59 fixed to the separators 56 and 57 clamp the electrolyte membrane 51 between them, whereby the sealing property is secured as mentioned above, there is a disadvantage that the electrolyte membrane 51 tends to be broken near the gaskets 58 and 59. The electrolyte membrane 51 tends to be affected by dry and wet due to operation and stop of the cell, and there is a risk that the electrolyte membrane 51 is broken in a short time period due to a great stress caused by compression and expansion of the membrane. Further, in accordance with the prior art mentioned above, since the spacer 63 having a high rigidity must be independently arranged in the portion of the gas communication groove 62, an assembling step for the cell is complex, and thus a contact state with the electrolyte membrane 51 is different from the other portions, so that the structure is made such that the electrolyte membrane 51 tends to be broken.

Further, in accordance with the prior art mentioned above, since the constituting parts are sequentially assemble data time of assembling the cell, there is a disadvantage that the assembling step is complex in view of this point. That is, as described above, the fuel cell has the separator constituted by the carbon plate or the like, the membrane electrode complex for reacting the gas, the gas diffusion layer made of a carbon fiber or the like for promoting a gas diffusion, and the gasket made of a rubber elastic material or the like for sealing the gas and a refrigerant, as the main constituting parts, however, since these constituting parts have been conventionally assembled sequentially at a time of assembling the fuel cell, a lot of labor and time are required for this assembly. On the other hand, in recent years, there has been invented an integral product of the separator and the gasket in which the gasket is integrally formed directly on the carbon plate (refer to Japanese Unexamined Patent Publication No. 2000-133288), however, it is impossible to avoid the structure in which the spacer 63 having a high rigidity is independently arranged in the portion of the gas communication groove 62, so that the cell assembling step becomes complex, and it is hard to carry out an automation for the purpose of reducing the manufacturing cost, in a stacking step of alternately stacking the separator and the UEA.

The gas diffusion layer is made of a sintered body, a woven fabric or a non-woven fabric of a fiber-like material such as a carbon fiber, a metal fiber, an inorganic fiber or the like, and is a porous body having a continuous gas permeability since a gas permeability is required. Accordingly, a rigidity and a strength are lower than a dense structure body, the gas diffusion layer tends to be collapsed due to an excessive pressurization so as to be permanently deformed, and a handling property is not good in view of an assembling work. Accordingly, shapes of the gaskets are not uniformed due to a breakage, a collapse or a deformation of the gas diffusion layer caused by pressurizing for positioning or integrating at a time of forming the gasket or assembling with the membrane electrode complex, the separator or the like after forming the gasket, so that there is fear that a surface pressure required for sealing with respect to an opposing surface to the gasket is short or excessive. Further, since the gas diffusion layer has the porous structure, there is fear that a gas is leaked in a layer direction of the gas diffusion layer.

The present invention is made by taking the above matter into consideration, and an object of the present invention is to provide a fuel cell and a manufacturing method of the same which can effectively prevent an electrolyte membrane from being broken, can make an assembling step for the fuel cell easy, and can achieve an excellent sealing property.

In this case, the present invention can be also applied to a fuel cell which directly use a liquid fuel such as a methanol or the like (a direct methanol fuel cell), in addition to a fuel cell which uses a gas fuel such as a hydrogen or the like.

DISCLOSURE OF THE INVENTION

In order to achieve the object mentioned above, in accordance with a first aspect of the present invention, there is provided a fuel cell comprising:

a membrane electrode complex in which catalyst layers are respectively arranged on both surfaces of a electrolyte membrane;

first and second gas diffusion layers which are arranged on both surfaces of the electrode complex;

separators for respectively supplying reaction gas to the first and second gas diffusion layers; and a gasket for sealing the reaction gas, wherein the gasket is formed on a surface of the gas diffusion layer so as to oppose to the separator, at least the gasket forming portion of the gas diffusion layer has a lower void content than the portion which is in contact with the catalyst layer, and the gasket arranged in the first and second gas diffusion layers is integrally formed at least via a through hole passing through both the first and second gas diffusion layers.

Further, in accordance with a second aspect of the present invention, there is provided a fuel cell comprising:

a membrane electrode complex in which catalyst layers are respectively arranged on both surfaces of a electrolyte membrane;

first and second gas diffusion layers which are arranged on both surfaces of the electrode complex;

separators for respectively supplying reaction gas to the first and second gas diffusion layers; and a gasket for sealing the reaction gas, wherein the gasket is formed on a surface of the gas diffusion layer so as to oppose to the separator, at least the gasket forming portion of the gas diffusion layer has a lower void content than the portion which is in contact with the catalyst layer, and the gasket arranged in the first and second gas diffusion layers is connected to an insulating spacer provided on a back surface of the gas diffusion layers via a through hole provided in each of the gas diffusion layers.

Further, in accordance with a third aspect of the present invention, there is provided a fuel cell comprising:

a membrane electrode complex in which catalyst layers are respectively arranged on both surfaces of a electrolyte membrane;

first and second gas diffusion layers which are arranged on both surfaces of the electrode complex;

separators for respectively supplying reaction gas to the first and second gas diffusion layers; and a gasket for sealing the reaction gas, wherein the gasket is formed on a surface of the gas diffusion layer so as to oppose to the separator, at least the gasket forming portion of the gas diffusion layer has a lower void content than the portion which is in contact with the catalyst layer, and the gasket arranged in the first and second gas diffusion layers is integrally formed so as to cover at least end portions of the first and second gas diffusion layers.

Further, in accordance with a fourth aspect of the present invention, there is provided a fuel cell comprising:

a membrane electrode complex in which catalyst layers are respectively arranged on both surfaces of a electrolyte membrane;

first and second gas diffusion layers which are arranged on both surfaces of the electrode complex;

separators for respectively supplying reaction gas to the first and second gas diffusion layers; and a gasket for sealing the reaction gas, wherein the gasket is formed on a surface of the gas diffusion layer so as to oppose to the separator, at least the gasket forming portion of the gas diffusion layer has a reduced void content in comparison with the portion which is in contact with the catalyst layer.

Further, in accordance with a fifth aspect of the present invention, there is provided a method of manufacturing a fuel cell gasket as recited in the third aspect or the fourth aspect mentioned above, wherein an adhesive agent is applied to the gasket forming portion having the lower void content in the gas diffusion layer, and the gasket formed in a predetermined shape is bonded thereon.

Further, in accordance with a sixth aspect of the present invention, there is provided a method of manufacturing a fuel cell gasket as recited in the third aspect or the fourth aspect mentioned above, wherein an adhesive agent is applied to the gasket forming portion having the lower void content in the gas diffusion layer, and the gasket is formed thereon in accordance with any one of an injection molding method, a print method, a dispenser method, a spray method and a compression molding method.

Further, in accordance with a seventh aspect of the present invention, there is provided a method of manufacturing a fuel cell gasket as recited in the third aspect or the fourth aspect mentioned above, wherein the gasket is formed in the gasket forming portion having the lower void content in the gas diffusion layer in accordance with any one of an injection molding method, a print method, a dispenser method, a spray method and a compression molding method by using an adhesive rubber as a material.

Further, in accordance with an eighth aspect of the present invention, there is provided a method of manufacturing a fuel cell gasket as recited in the third aspect or the fourth aspect mentioned above, wherein a surface roughness is secured in the gasket forming portion having the lower void content in the gas diffusion layer, and the gasket is formed thereon in accordance with any one of an injection molding method, a print method, a dispenser method, a spray method and a compression molding method.

Further, in accordance with a ninth aspect of the present invention, there is provided a fuel cell as recited in any one of the first aspect to the fourth aspect mentioned above, wherein the void content of the gasket forming portion is reduced by impregnating any one of rubber, resin, carbon and an inorganic material in the gasket forming portion of the gas diffusion layer.

Further, in accordance with a tenth aspect of the present invention, there is provided a fuel cell as recited in any one of the first aspect to the fourth aspect mentioned above, wherein a bulk density is made high in the gasket forming portion of the gas diffusion layer, and the void content is reduced in the gasket forming portion of the gas diffusion layer.

Further, in accordance with an eleventh aspect of the present invention, there is provided a fuel cell as recited in any one of the first aspect to the fourth aspect mentioned above, wherein a gasket made of a rubber-like elastic material is formed after previously impregnating any one of rubber, resin, carbon and an inorganic material in the gasket forming portion of the gas diffusion layer, and bonding a membrane electrode complex to the first and second gas diffusion layers.

Further, in accordance with a twelfth aspect of the present invention, there is provided a gas diffusion layer for a fuel cell, the gas diffusion layer being used in the fuel cell as recited in any one of the first aspect to the fourth aspect mentioned above, wherein rubber or resin is impregnated in the gasket forming portion of the gas diffusion layer, and an insulating spacer made of rubber or resin is formed on one surface of the impregnation portion.

Further, in accordance with a thirteenth aspect of the present invention, there is provided a gas diffusion layer for a fuel cell, the gas diffusion layer being used in the fuel cell as recited in any one of the first aspect to the fourth aspect mentioned above, wherein rubber or resin is impregnated in the gasket forming portion of the gas diffusion layer, and a gasket made of a rubber-like elastic material is formed at least in the gasket forming portion of the gas diffusion layer.

Further, in accordance with a fourteenth aspect of the present invention, there is provided a method of manufacturing a gasket of a fuel cell recited in any one of the first aspect to the fourth aspect mentioned above, comprising the steps of:

arranging and bonding first and second gas diffusion layers on both surfaces of a membrane electrode complex in which catalyst layers are respectively arranged at least on both surfaces of a electrolyte membrane; and thereafter forming a gasket on the gasket diffusion layer surface facing to a separator by rubber or resin and simultaneously carrying out an impregnation process in the gasket forming portion of the gas diffusion layer.

Further, in accordance with a fifteenth aspect of the present invention, there is provided a fuel cell as recited in any one of the first aspect to the fourth aspect mentioned above, wherein the gaskets are provided at corresponding positions with respect to the membrane electrode complex, in portions in which the gaskets are formed on the surfaces of the first and second gas diffusion layers so as to face to the separator.

Further, in accordance with a sixteenth aspect of the present invention, there is provided a fuel cell as recited in any one of the first aspect to the fourth aspect mentioned above, wherein a groove which receives at least the gasket is formed in the separator, the groove is shallower than the height of the gasket, and a cross sectional area thereof is larger than a cross sectional area of the gasket.

Further, in accordance with a seventeenth aspect of the present invention, there is provided a fuel cell as recited in any one of the first aspect to the fourth aspect mentioned above, wherein an outer size of the electrolyte membrane is smaller than an outer size of the gas diffusion layer, and electrolyte membrane is arranged in an inner portion of a surfaces of the gas diffusion layers.

In accordance with the fuel cell on the basis of the first aspect of the present invention provided with the structure mentioned above, it becomes possible to easily form the gaskets respectively formed on the surfaces of the first and second gas diffusion layers so as to face to the separator, at the corresponding positions with respect to the membrane electrode complex. Further, since it is possible to integrally form the gasket via the through hole commonly passing through the first and second gas diffusion layers, it is possible to form the gaskets on both surfaces by one step. Further, since the gasket is integrally formed via the through hole commonly passing through the first and second gas diffusion layers, whereby it is possible to securely fix the gasket to the gas diffusion layer, it is possible to prevent the gasket from coming off from the gas diffusion layer and from being displaced. Further, it is possible to optionally set the height of the gasket without relation to the thickness of the UEA in the gasket forming portion.

Further, in accordance with the fuel cell on the basis of the second aspect of the present invention provided with the structure mentioned above, it is possible to integrally form the gasket material impregnated portion as well as the gasket and the insulating spacer are integrally formed. Further, since the gasket and the insulating spacer are connected via the through hole provided in the first or second gas diffusion layer, whereby it is possible to securely fix the gasket and the insulating spacer to the gas diffusion layer, it is possible to prevent the gasket from coming off from the gas diffusion layer and from being displaced.

Further, in accordance with the fuel cell on the basis of the third aspect of the present invention provided with the structure mentioned above, it is possible to easily form the gaskets respectively formed on the surfaces of the first and second gas diffusion layers so as to face to the separator, at the corresponding positions with respect to the membrane electrode complex. Further, since the gasket is integrally formed so as to cover the end portions of the first and second gas diffusion layers, it is possible to form the gaskets on both surfaces by one step, and it is possible to form the gasket in a C shape at an end portion of the UEA, whereby it is possible to securely prevent the reaction gas from leaking from the end portion of the gas diffusion layer, an interface of the gas diffusion layer and the insulating spacer, or the interface of the insulating spacers as well as it is possible to secure the insulation in the end portion of the UEA.

Further, in accordance with the fuel cell on the basis of the fourth aspect of the present invention provided with the structure mentioned above, it becomes possible to easily form the gaskets respectively formed on the surfaces of the first and second gas diffusion layers so as to face to the separator, at the corresponding positions with respect to the membrane electrode complex, by forming the gasket after previously integrating the UEA. Further, since the gasket is formed after integrating the UEA, it is possible to form the gaskets on both surfaces by one step. Further, it is possible to fix the gasket to the gasket diffusion layer by simultaneously carrying out the previous impregnation of the gasket material in the gasket forming portion and the forming of the gasket, before integrating the UEA.

Further, in addition to the operation in the third aspect or the fourth aspect of the present invention mentioned above, in accordance with the manufacturing method on the basis of the fifth aspect of the present invention provided with the structure mentioned above, it becomes possible to fix the gasket to the gas diffusion layer by applying the adhesive agent to the gasket forming portion.

Further, in accordance with the manufacturing method on the basis of the sixth aspect of the present invention provided with the structure mentioned above, in addition to the same operation as that of the fifth aspect of the present invention mentioned above, it becomes possible to fix the gasket to the gas diffusion layer by applying the adhesive agent to the gasket forming portion. Further, in accordance with the present forming method, it is possible to carry out a lot of processes in a short time.

Further, in accordance with the manufacturing method on the basis of the seventh aspect of the present invention provided with the structure mentioned above, the same operation as that of the sixth aspect mentioned above can be achieved by using the adhesive rubber material.

Further, in accordance with the manufacturing method on the basis of the eighth aspect of the present invention provided with the structure mentioned above, the same operation as that of the sixth aspect mentioned above can be achieved by securing the surface roughness of the gas diffusion layer and forming the gasket thereon.

Further, in addition to the operation in any one of the first aspect to the fourth aspect of the present invention mentioned above, in accordance with the fuel cell on the basis of the ninth aspect of the present invention provided with the structure mentioned above, in addition to the same operation as that of the first aspect to the fourth aspect mentioned above, it becomes possible to easily reduce a void content by impregnating the material described as a filler in the void of the gas diffusion layer. The filler may be the same kind as the material forming the gas diffusion layer or different therefrom.

Further, in accordance with the fuel cell on the basis of the tenth aspect of the present invention provided with the structure mentioned above, in addition to the same operation as that of the first aspect to the fourth aspect mentioned above, it becomes possible to reduce the void content by making a bulk density high. In this case, in the tenth aspect, the void content is reduced by increasing a provision amount of the gasket forming portion at a time of manufacturing the gas diffusion layer, or compressing the gasket forming portion. In the latter case of reducing the void content by compressing the gasket forming portion, since only the gasket forming portion is excessively compressed even when the provision amount is fixed, the void space in this portion is a little, and only this portion is formed thinner than the other portions.

Further, in accordance with the fuel cell on the basis of the eleventh aspect of the present invention provided with the structure mentioned above, in addition to the same operation as that of the first aspect to the fourth aspect mentioned above, it becomes possible to select a material which is most suitable for the respective processes in the case of setting the material impregnated in the gas diffusion layer different from the gasket material. Further, it is possible to make a rigidity or a strength of the impregnation portion high by impregnating the filler described in the present aspect in the gas diffusion layer, and it is possible to make it easy to fix a carbon fiber of the gas diffusion layer.

Further, in accordance with the gas diffusion layer on the basis of the twelfth aspect of the present invention provided with the structure mentioned above, in addition to the same operation as that of the first aspect to the fourth aspect mentioned above, it is possible to make the rigidity or the strength of the impregnation portion high by impregnating the filler described in the present aspect in the gas diffusion layer, and it is possible to entrench the carbon fiber of the gas diffusion layer. Further, since the insulating spacer is fixed to the gas diffusion layer, it becomes possible to make it easy to integrally bond the UEA.

Further, in accordance with the gas diffusion layer on the basis of the thirteenth aspect of the present invention provided with the structure mentioned above, it is possible to achieve the same operation as that of the first aspect to the fourth aspect mentioned above.

Further, in accordance with the manufacturing method on the basis of the fourteenth aspect of the present invention provided with the structure mentioned above, in addition to the same operation as that of the first aspect to the fourth aspect mentioned above, since the gasket forming and the impregnating process can be carried out at the same time, it becomes possible to shorten the process.

Further, in accordance with the fuel cell on the basis of the fifteenth aspect of the present invention provided with the structure mentioned above, it is possible to achieve the same operation as that of the first aspect to the fourth aspect mentioned above.

Further, in accordance with the fuel cell on the basis of the sixteenth aspect of the present invention provided with the structure mentioned above, in addition to the same operation as that of the first aspect to the fourth aspect mentioned above, the gasket is received in the groove formed in the separator, and the gasket is completely received within the groove at a time of fastening the stack. Further, the UEA and the separator are in contact with each other in the end portion in the same manner as the center portion.

Further, in accordance with the fuel cell on the basis of the seventeenth aspect of the present invention provided with the structure mentioned above, in addition to the same operation as that of the first aspect to the fourth aspect mentioned above, it becomes possible to reduce a used amount of the electrolyte membrane which is comparatively expensive.

The expression "the void content is low" or "make the void content low" in each of the aspects mentioned above means making the rigidity or the strength of this portion high by making the void content of the gasket forming portion lower than the other portions, and means making it easy to form the gasket by forming the gasket on the portion having the low void content and having the structure mentioned above. Further, since the size, the shape and the like of the gasket to be formed are standardized (it is easy to form in a planned shape), it is possible to secure an excellent sealing property, and this means that it becomes possible to make an assembling work easy. Further, since the gas diffusion layer has a porous structure, it also means that it is possible to achieve an effect of preventing the gas from leaking in the layer direction of the gas diffusion layer. The impregnation material is impregnated appropriately at a required amount in correspondence to the hardness or the like, and the rate of impregnation is different in correspondence to the rigidity and the shape of the material to be impregnated, the impregnating method or the like.

The void content of the gas diffusion layer is generally between 60 and 90%, and when the void content of the gasket forming portion is low in comparison with the portion being in contact with the catalyst layer, it approximately corresponds to 2% to 100% of the void, depending upon the hardness and the shape of the filler and the impregnating method, and it is generally about 50% or more.

As the adhesive agent applied to the gasket forming portion in the gas diffusion layer, in correspondence to the kind of the rubber used as the gasket, there is suitably used a silicone adhesive agent, a phenol adhesive agent, an epoxy adhesive agent, an acrylic adhesive agent, an adhesive agent based on a thermoplastic resin, a thermosetting resin or a rubber such as a chroman indene adhesive agent or the like, an adhesive primer such as a silane coupling agent, a titanium coupling agent or the like containing a functional group such as an epoxy group, an amino group, a vinyl group or the like, and an adhesive agent obtained by blending the adhesive primer in the thermoplastic resin adhesive agent, the thermosetting adhesive agent or the rubber adhesive agent.

With respect to the surface roughness of the gasket forming portion in the gas diffusion layer, if it is 0.1 μm or more, preferably, 1 μm or more, it is convenient for the surface roughness by which the adhesion with the rubber forming the gasket can be sufficiently secured. Since the gas diffusion layer itself generally has a porous structure, there is a structure which is within the surface roughness range, however, it is necessary to appropriately secure the surface roughness which is sufficient for the adhesion, in accordance with the filler, the amount thereof, the impregnating method and the like.

As described above, as the material to be impregnated (the impregnation material), rubber, resin, carbon, an inorganic material or the like is proper.

Among them, first, as the rubber to be impregnated, there is used a saturation type rubber such as an ethylene propylene rubber, a fluorine-contained rubber, a silicon rubber, a fluorosilicon rubber, a butyl rubber, a hydrogenated styrene butadiene rubber, a hydrogenated styrene isoprene rubber, an acrylic rubber, a fluoroacrylic rubber, and the like, or a saturation type elastomer such as a polyester elastomer, a polyolefine elastomer, a polyamide elastomer and the like. They are impregnated by heating and pressurizing, or a solution thereof or a latex thereof is impregnated. Further, there is used a saturation type liquid rubber such as a liquid silicon rubber, a liquid fluorosilicon rubber, a liquid fluorine-contained rubber, a liquid butyl rubber, a liquid ethylene propylene rubber and the like, and they are impregnated by heating or pressuring, or heating and pressurizing, or forming the solution thereof.

As the resin to be impregnated, there is used a thermosetting resin, a thermoplastic resin or the like. Since the thermosetting resin is in a liquid state at a room temperature or is liquefied by being heated, it is used as it is or being diluted by a solvent or the like. In the case of the thermoplastic resin, it is used by being heated and pressurized, being diluted by the solvent or the like or as an emulsion. The impregnating method is appropriately selected from the methods mentioned above in correspondence to a nature (mainly a viscosity) thereof. As the thermosetting resin, there is used a silicon resin, an epoxy resin, a phenol resin, a thermosetting polyimide resin, a diallyl phthalate resin or the like, and a prepolymer of the thermosetting resin is impregnated in the gas diffusion layer. As the thermoplastic resin, a polyolefine resin, a polysulfone resin, a polyester resin, a polyamide resin, a polyimide resin, a polyamide imide resin, a polycarbonate resin, a fluorine-contained resin, polyether imide, a polyether ether ketone, a polystyrene, a polyphenylene sulfide, a polyphenylene ether, or the like, and the resin is made in a heated and molten state, in a solution state by being dissolved in a good solvent, or in a dispersion state in which the resin is dispersed into the liquid such as the water or the like in a fine particle state, thereby being impregnated in the gas diffusion layer. The viscosity of the prepolymer or the dispersion liquid may be set within a range capable of being impregnated in the gas diffusion layer, and the viscosity is different in correspondence to the impregnating method and the impregnating condition, however, is about $10^0$ to $10^4$ Pa·s.

As the carbon to be impregnated, there is used a carbon powder, a carbon black, a graphite powder, a carbon fiber, a graphite fiber or the like, and, for example, a fine particle is dispersed into a liquid so as to be impregnated in accordance with a pressurizing spray, a pressurizing injection or the like. Further, the fine particle may be added to the resin solution or the resin dispersion liquid so as to be impregnated in accordance with the method as described in the seventh aspect of the present invention or the like in correspondence to the nature (mainly the viscosity) thereof.

As the inorganic material to be impregnated, there is used a glass powder, a glass fiber, a material which is changed from a sol to a gel so as to become an inorganic material, or the like. Further, the fine particle may be added to the rubber, the resin solution or the resin dispersion liquid so as to be impregnated in accordance with the method as described in the seventh aspect of the present invention or the like in correspondence to the nature (mainly the viscosity) thereof.

The rubber used as the gasket is obtained by forming the same group of rubber or the different rubbers in accordance with the method as described in the seventh aspect of the present invention or the like in correspondence to the nature (mainly the viscosity) thereof, in the same manner as the rubber impregnated in the gasket portion of the gas diffusion layer. For example, in the case of the liquid rubber, it is possible to use any methods described in the seventh aspect of the present invention. In the case of the rubber having a high viscosity, a normal injection molding method or compression molding method is used. As the adhesive rubber, it is possible to use a rubber in which the rubber itself has an adhesive property, a rubber in which an adhesion improving agent applying an adhesion to the rubber is added, and the like, and as an example thereof, it is possible to list up a self-adhesion liquid silicon rubber, a self-adhesion liquid fluorine-contained rubber, a rubber in which an epoxy adhesive agent or a phenol adhesive agent is blended in the fluorine-contained rubber.

The insulating spacer can be formed by a liquid rubber, a thermosetting resin or a thermoplastic resin. In the case of using the liquid rubber, it is possible to use the same material as the liquid rubber impregnated in the gas diffusion layer or the liquid rubber forming the gasket, and it is possible to simultaneously form. Further, in the case of using the thermosetting resin or the thermoplastic resin, it is possible to use the same kind as the resin impregnated in the gas diffusion layer, and it is possible to simultaneously form. Of course, it is possible to independently form on the basis of the different kind of material from the material mentioned above. As the thermoplastic resin, fluorine-contained resin such as polytetrafluoroethylene (PTFE) or the like, polyolefine or the like is suitable.

BEST MODE FOR CARRYING OUT THE INVENTION

Next, a description will be given of embodiments in accordance with the present invention with reference to the accompanying drawings.

First Embodiment

Figure 1:
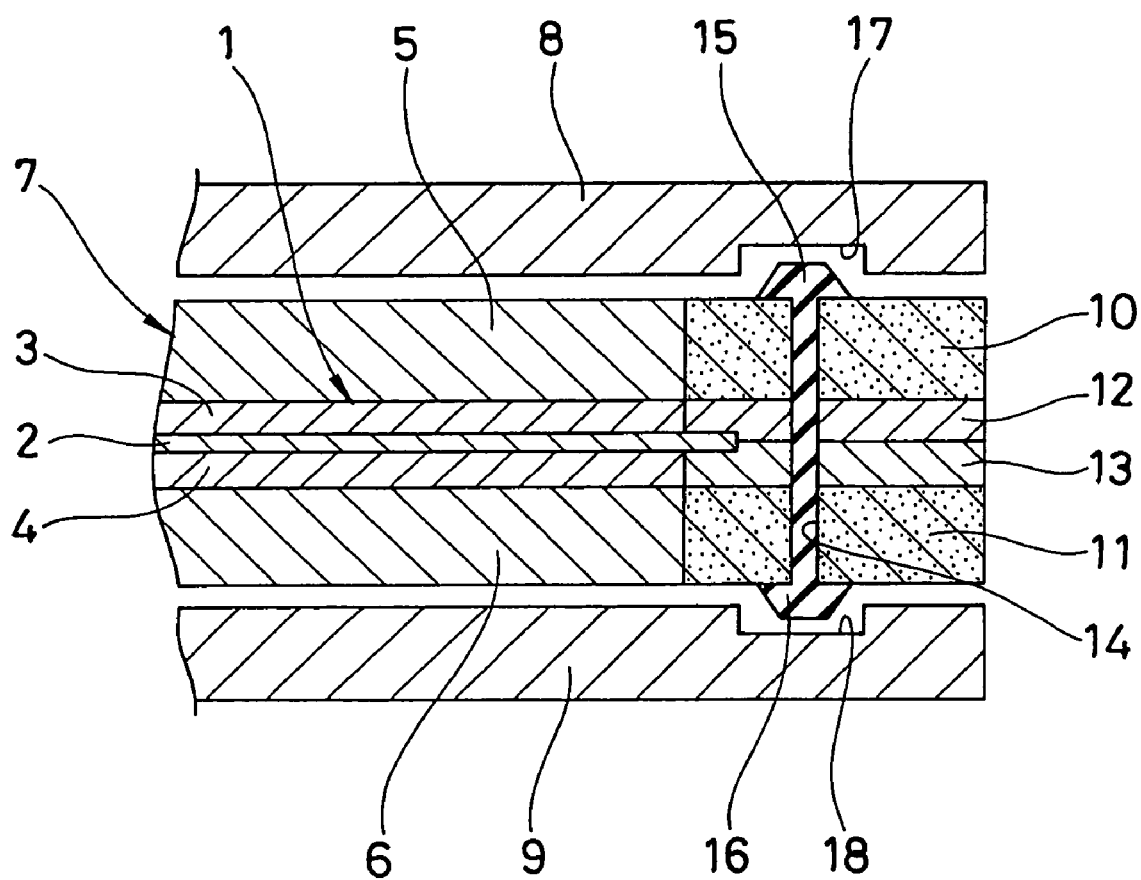
FIG. 1 is a cross sectional view of a main portion of a fuel cell in accordance with a first embodiment of the present invention.

FIG. 1 shows a first embodiment in which a gasket is formed after previously inserting a sheet made of a different material from a gasket as an insulating spacer so as to form an UEA.

That is, catalyst layers 3 and 4 are arranged on both surfaces of an electrolyte membrane 2 so as to form a membrane electrode complex 1, gas diffusion layers 5 and 6 are arranged on both surfaces of the membrane electrode complex 1 so as to form an UEA 7, and separators 8 and 9 are arranged on both surfaces of the UEA 7. The gas diffusion layers 5 and 6 constituted by a porous body such as a carbon fiber or the like are structured such that a size thereof is set to be larger than a size of the catalyst layers 3 and 4, a gasket forming material is previously impregnated in a protruding portion in a plan direction, whereby impregnation portions 10 and 11 having a comparatively low void content are formed, and insulating spacers 12 and 13 constituted by a sheet made of a different material from that of the gaskets 15 and 16 are interposed between the impregnation portions 10 and 11. A desired number of through holes 14 are formed in the impregnation portions 10 and 11 and the insulating spacers 12 and 13 in such a manner as to extend therethrough in a thickness direction. The gaskets 15 and 16 made of a rubber-like elastic material are arranged on surfaces of the impregnation portions 10 and 11 corresponding to the gasket forming portions in the gas diffusion layers 5 and 6 so as to face to the separators 8 and 9, and the gaskets 15 and 16 are integrally formed with each other via the thorough holes 14. Groove-like gasket receiving portions 17 and 18 are formed in the separators 8 and 9 so as to correspond to the gaskets 15 and 16. The electrolyte membrane 2 is set smaller in a size than a size of the gas diffusion layers 5 and 6. Accordingly, the electrolyte membrane 2 does not reach the through hole 14. It is sufficient that the electrolyte membrane 2 protrudes at least more than the end portions of the catalyst layers 3 and 4.

Second Embodiment

Figure 2:
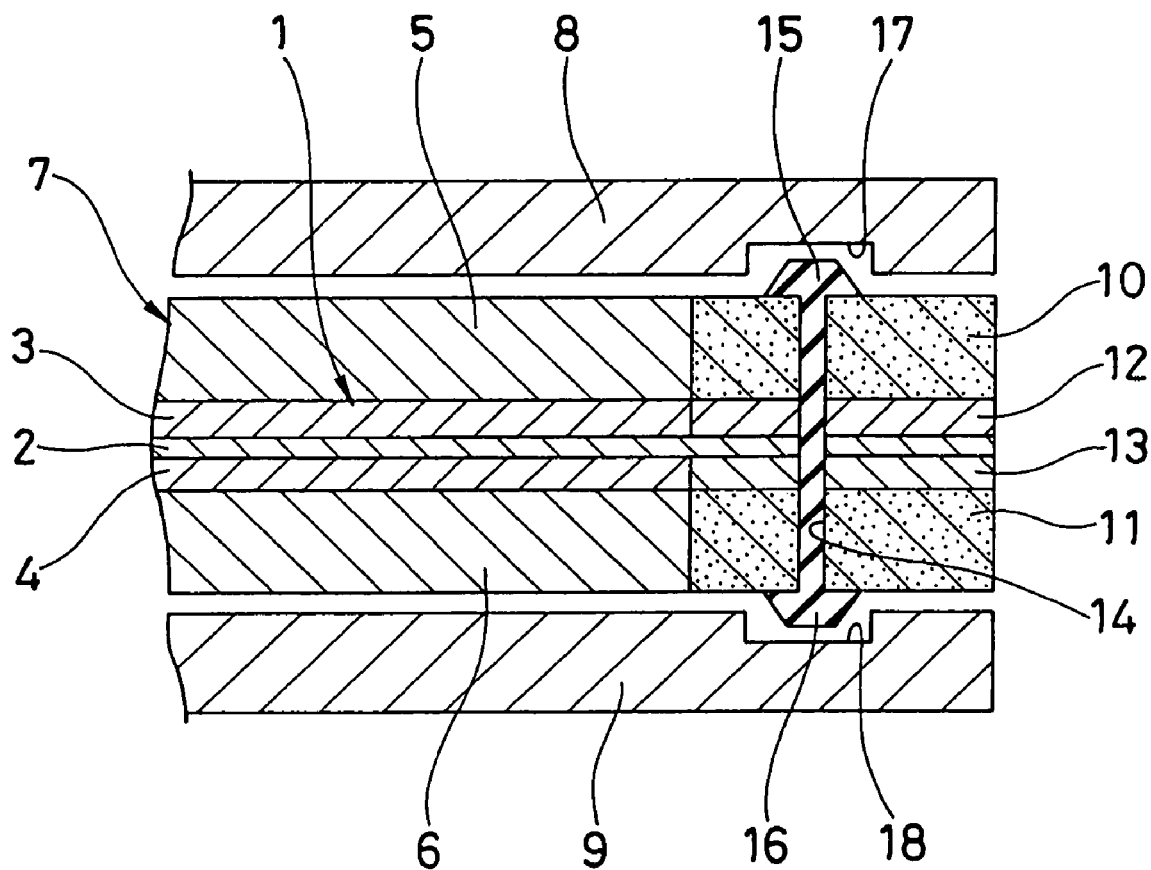
FIG. 2 is a cross sectional view of a main portion of a fuel cell in accordance with a second embodiment of the present invention.

FIG. 2 shows a second embodiment in which a gasket is formed after previously inserting a sheet made of a different material from the gasket as an insulating spacer so as to form the UEA.

That is, the catalyst layers 3 and 4 are arranged on both surfaces of the electrolyte membrane 2 so as to form the membrane electrode complex 1, the gas diffusion layers 5 and 6 are arranged on both surfaces of the membrane electrode complex 1 so as to form the UEA 7, and the separators 8 and 9 are arranged on both surfaces of the UEA 7. The gas diffusion layers 5 and 6 constituted by a porous body such as a carbon fiber or the like are structured such that the size thereof is set to be larger than the size of the catalyst layers 3 and 4, the gasket forming material is previously impregnated in a protruding portion in a plan direction, whereby the impregnation portions 10 and 11 having a comparatively low void content are formed, and the insulating spacers 12 and 13 constituted by a sheet made of a different material from that of the gaskets 15 and 16 are interposed between the impregnation portions 10 and 11. A desired number of through holes 14 are formed in the impregnation portions 10 and 11 and the insulating spacers 12 and 13 in such a manner as to extend therethrough in a thickness direction. The gaskets 15 and 16 made of a rubber-like elastic material are arranged on surfaces of the impregnation portions 10 and 11 corresponding to the gasket forming portions in the gas diffusion layers 5 and 6 so as to face to the separators 8 and 9, and the gaskets 15 and 16 are integrally formed with each other via the thorough holes 14. The groove-like gasket receiving portions 17 and 18 are formed in the separators 8 and 9 so as to correspond to the gaskets 15 and 16. The electrolyte membrane 2 is set equal in a size to the size of the gas diffusion layers 5 and 6. Accordingly, the electrolyte membrane 2 reaches the through hole 14, whereby the through hole 14 is also formed in the electrolyte membrane 2. The impregnating process of the impregnation portions 10 and 11 may be previously carried out prior to the integrating process, or may be carried out at the same time of forming the gaskets 15 and 16 after integrating the UEA 7.

Third Embodiment

Figure 3:
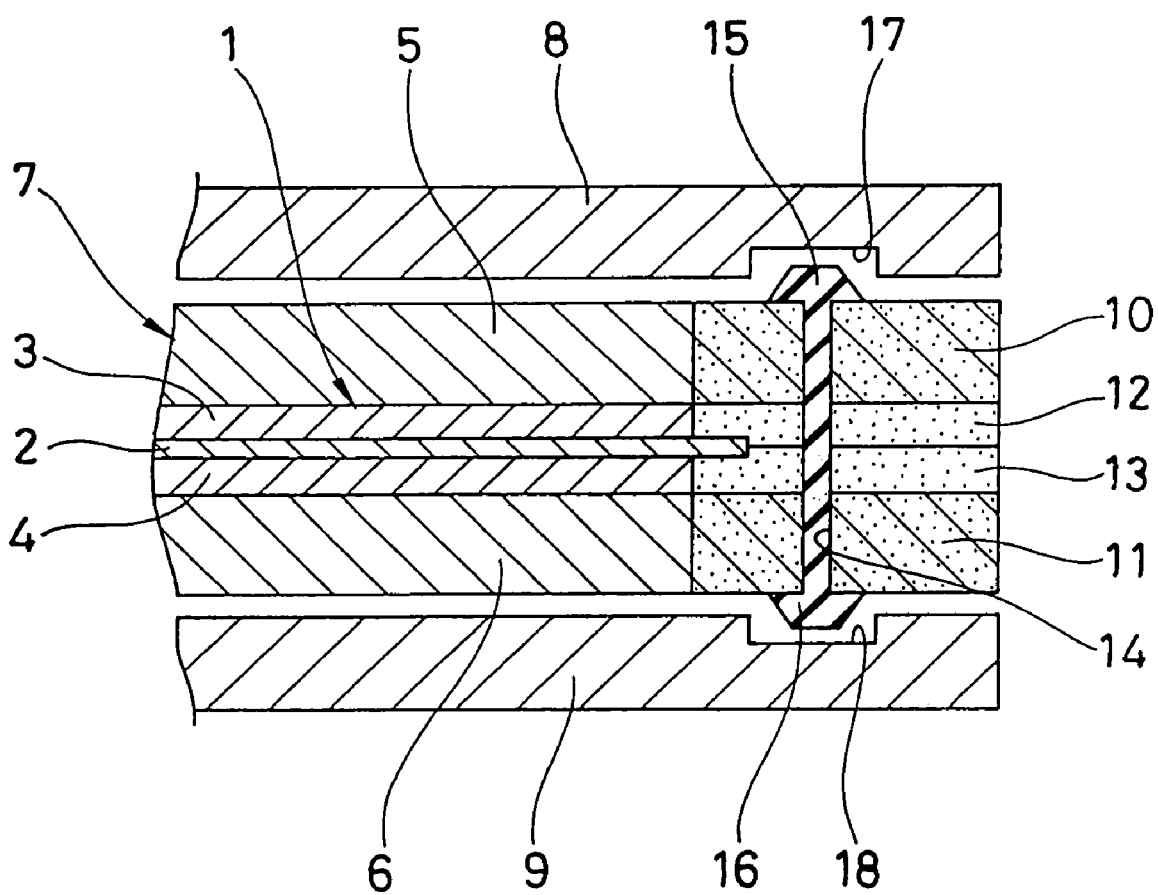
FIG. 3 is a cross sectional view of a main portion of a fuel cell in accordance with a third embodiment of the present invention.

FIG. 3 shows an embodiment in which a gasket is formed after previously forming an insulating spacer by the same material as the gasket material of the impregnation portion so as to form the UEA.

That is, the catalyst layers 3 and 4 are arranged on both surfaces of the electrolyte membrane 2 so as to form the membrane electrode complex 1, the gas diffusion layers 5 and 6 are arranged on both surfaces of the membrane electrode complex 1 so as to form the UEA 7, and the separators 8 and 9 are arranged on both surfaces of the UEA 7. The gas diffusion layers 5 and 6 constituted by a porous body such as a carbon fiber or the like are structured such that the size thereof is set to be larger than the size of the catalyst layers 3 and 4, the gasket forming material is previously impregnated in a protruding portion in a plan direction, whereby the impregnation portions 10 and 11 having a comparatively low void content are formed, and the insulating spacers 12 and 13 made of the same kind of material as that of the gasket material impregnation portions 10 and 11 are arranged between the impregnation portions 10 and 11 in accordance with an integral molding. A desired number of through holes 14 are formed in the impregnation portions 10 and 11 and the insulating spacers 12 and 13 in such a manner as to extend therethrough in a thickness direction. The gaskets 15 and 16 made of a rubber-like elastic material are arranged on surfaces of the impregnation portions 10 and 11 corresponding to the gasket forming portions in the gas diffusion layers 5 and 6 so as to face to the separators 8 and 9, and the gaskets 15 and 16 are integrally formed with each other via the thorough holes 14. The groove-like gasket receiving portions 17 and 18 are formed in the separators 8 and 9 so as to correspond to the gaskets 15 and 16. The electrolyte membrane 2 is set smaller in size than the size of the gas diffusion layers 5 and 6. However, this size may be equal to the size of the gas diffusion layers 5 and 6, and in this case, the through hole 14 is formed in the electrolyte membrane 2.

Fourth Embodiment

Figure 4:
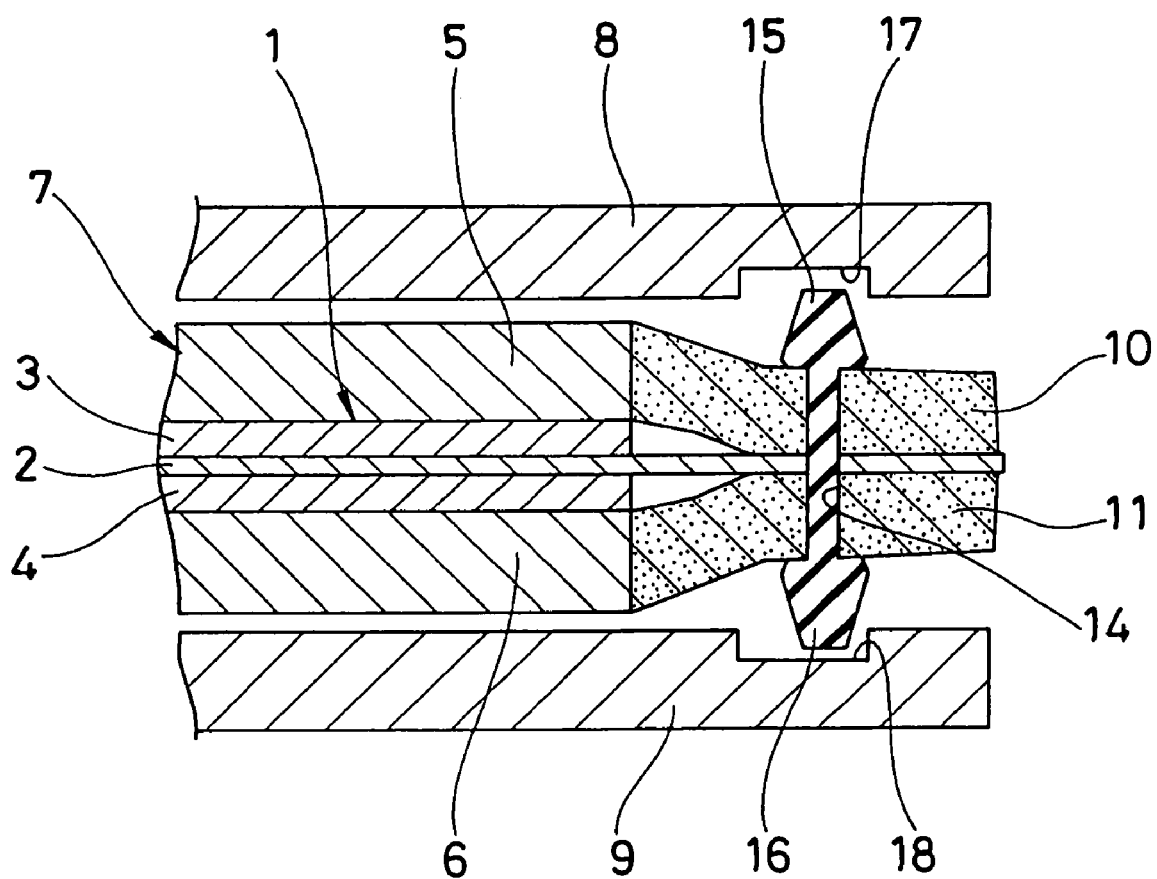
FIG. 4 is a cross sectional view of a main portion of a fuel cell in accordance with a fourth embodiment of the present invention.

FIG. 4 shows an embodiment in which a gasket is formed after forming the UEA by setting the electrolyte membrane to the insulating spacer. In accordance with this embodiment, even when the thickness of the UEA portion of the gasket forming portion is thinner than a reaction portion, it is possible to form a suitable gasket.

That is, the catalyst layers 3 and 4 are arranged on both surfaces of the electrolyte membrane 2 so as to form the membrane electrode complex 1, the gas diffusion layers 5 and 6 are arranged on both surfaces of the membrane electrode complex 1 so as to form the UEA 7, and the separators 8 and 9 are arranged on both surfaces of the UEA 7. The gas diffusion layers 5 and 6 constituted by a porous body such as a carbon fiber or the like are structured such that the size thereof is set to be larger than the size of the catalyst layers 3 and 4, the gasket forming material is previously impregnated in a protruding portion in a plan direction, whereby the impregnation portions 10 and 11 having a comparatively low void content are formed. As is different from the first to third embodiments mentioned above, the specific insulating spacer is not arranged between the impregnation portions 10 and 11, and the electrolyte membrane 2 doubles as a function of the insulating spacer so as to be directly in contact with the impregnation portions 10 and 11 of the gas diffusion layers 5 and 6. The impregnation portions 10 and 11 are deformed in a focusing direction by a rubber forming the gaskets 15 and 16, for the purpose of bringing the electrolyte membrane 2 into contact therewith. A desired number of through holes 14 are formed in the impregnation portions 10 and 11 and the electrolyte membrane 2 in such a manner as to extend therethrough in a thickness direction. The gaskets 15 and 16 made of a rubber-like elastic material are arranged on surfaces of the impregnation portions 10 and 11 corresponding to the gasket forming portions in the gas diffusion layers 5 and 6 so as to face to the separators 8 and 9, and the gaskets 15 and 16 are integrally formed with each other via the thorough holes 14. The groove-like gasket receiving portions 17 and 18 are formed in the separators 8 and 9 so as to correspond to the gaskets 15 and 16. The size of the electrolyte membrane 2 is set equal to the size of the gas diffusion layers 5 and 6.

Fifth Embodiment

Figure 5:
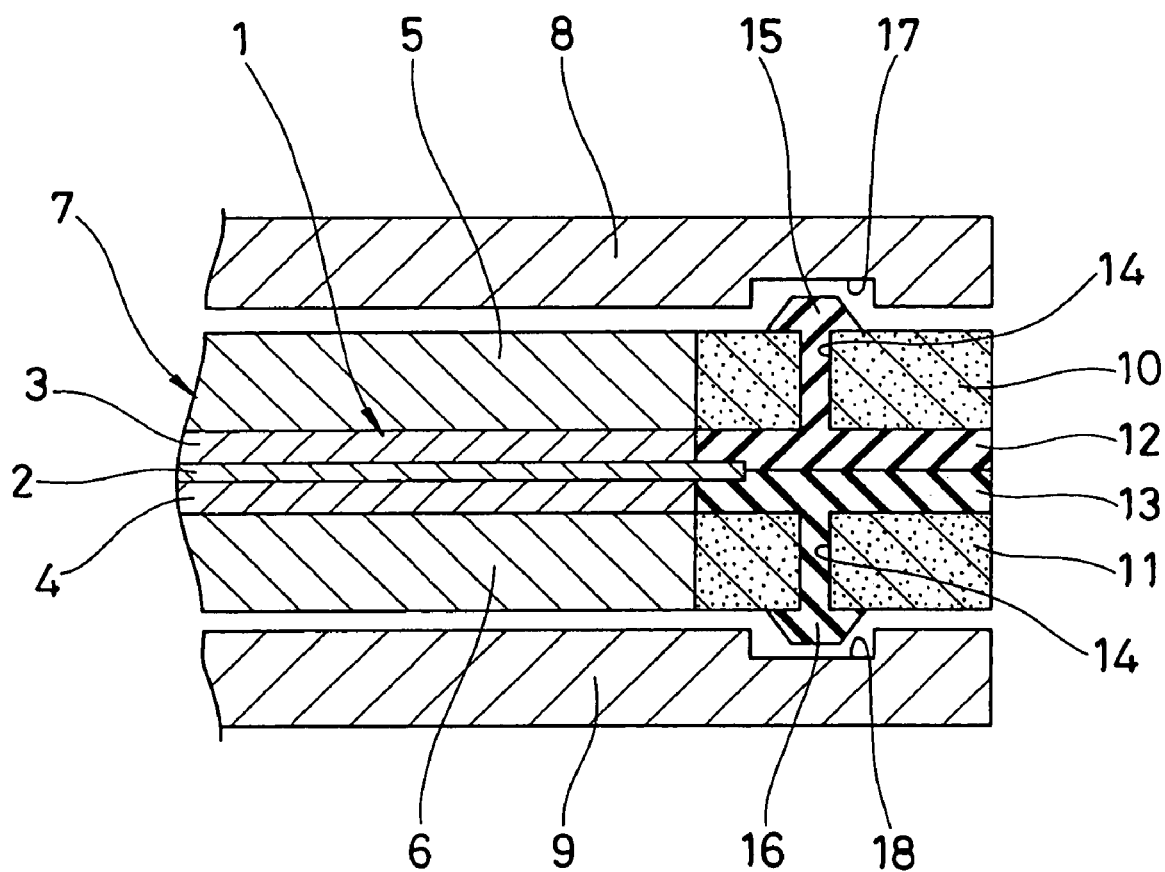
FIG. 5 is a cross sectional view of a main portion of a fuel cell in accordance with a fifth embodiment of the present invention.

FIG. 5 shows an embodiment in which the UEA is formed after the insulating spacer and the gasket are previously formed integrally.

That is, the catalyst layers 3 and 4 are arranged on both surfaces of the electrolyte membrane 2 so as to form the membrane electrode complex 1, the gas diffusion layers 5 and 6 are arranged on both surfaces of the membrane electrode complex 1 so as to form the UEA 7, and the separators 8 and 9 are arranged on both surfaces of the UEA 7. The gas diffusion layers 5 and 6 constituted by a porous body such as a carbon fiber or the like are structured such that the size thereof is set to be larger than the size of the catalyst layers 3 and 4, the gasket forming material is previously impregnated in a protruding portion in a plan direction, whereby the impregnation portions 10 and 11 having a comparatively low void content are formed, and the insulating spacers 12 and 13 made of the same material as that of the gaskets 15 and 16 are respectively interposed between the impregnation portions 10 and 11. The through holes 14 are formed in the impregnation portions 10 and 11 in such a manner as to extend therethrough in a thickness direction. The gaskets 15 and 16 made of a rubber-like elastic material are arranged on surfaces of the impregnation portions 10 and 11 corresponding to the gasket forming portions in the gas diffusion layers 5 and 6 so as to face to the separators 8 and 9, and the gaskets 15 and 16 are integrally formed with the insulating spacers 12 and 13 via the thorough holes 14, respectively. The groove-like gasket receiving portions 17 and 18 are formed in the separators 8 and 9 so as to correspond to the gaskets 15 and 16. The electrolyte membrane 2 is set smaller in size than the size of the gas diffusion layers 5 and 6, however, may have the size equal to the size of the gas diffusion layers 5 and 6.

In this case, in the present embodiment, there is shown the embodiment in which the insulating spacers 12 and 13 are separated, however, the insulating spacers 12 and 13 may be formed as an integrated insulating spacer.

Sixth Embodiment

Figure 6:
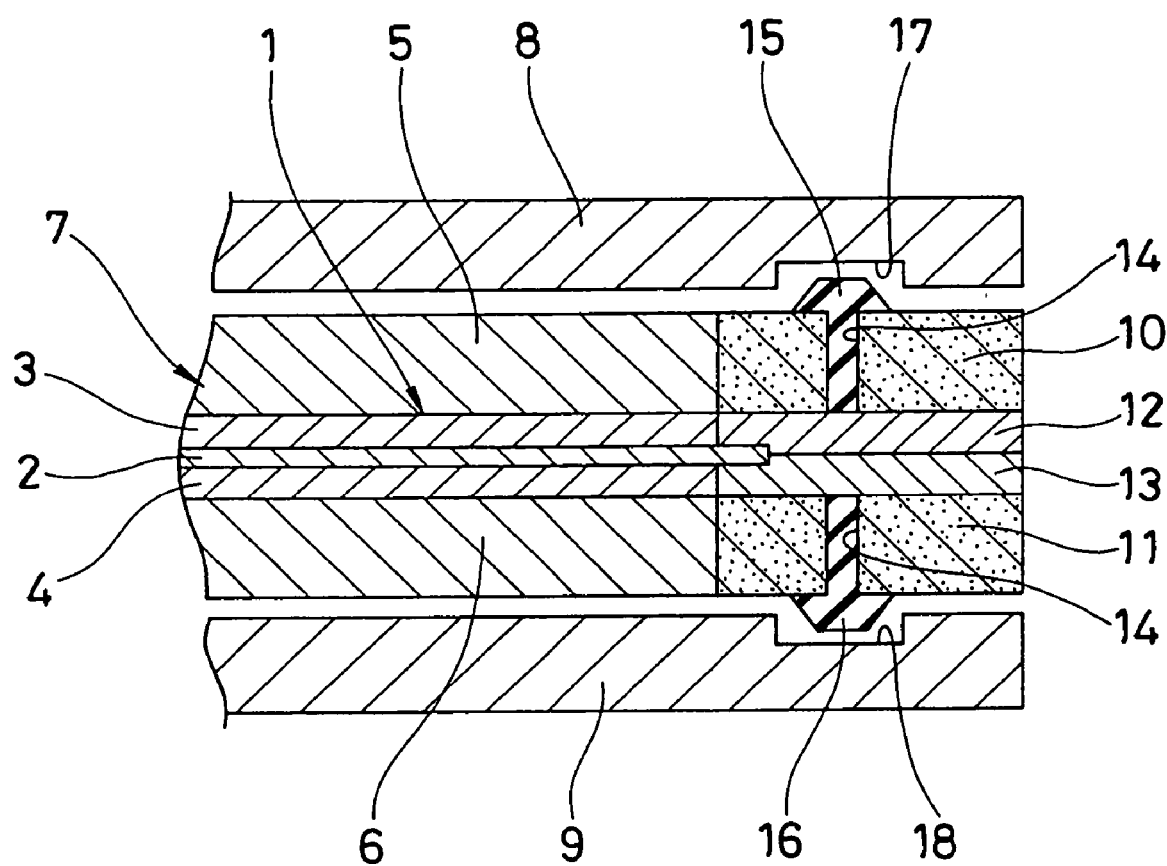
FIG. 6 is a cross sectional view of a main portion of a fuel cell in accordance with a sixth embodiment of the present invention.

FIG. 6 shows another embodiment in which the UEA is formed after the insulating spacer and the gasket are previously formed integrally. The gaskets 15 and formed in the impregnation portions 10 and 11 of the gas diffusion layers 5 and 6 and the insulating spacers 12 and 13 are integrally formed respectively. The gaskets 15 and 16 and the insulating spacers 12 and 13 are integrally formed respectively by impregnating the impregnation portions 10 and 11 with a phenol resin, thereafter opening the through holes 14, arranging the insulating spacers 12 and 13 constituted by a thermoplastic resin sheet, and forming the gaskets 15 and 16 by a liquid silicon rubber.

Seventh Embodiment

Figure 7:
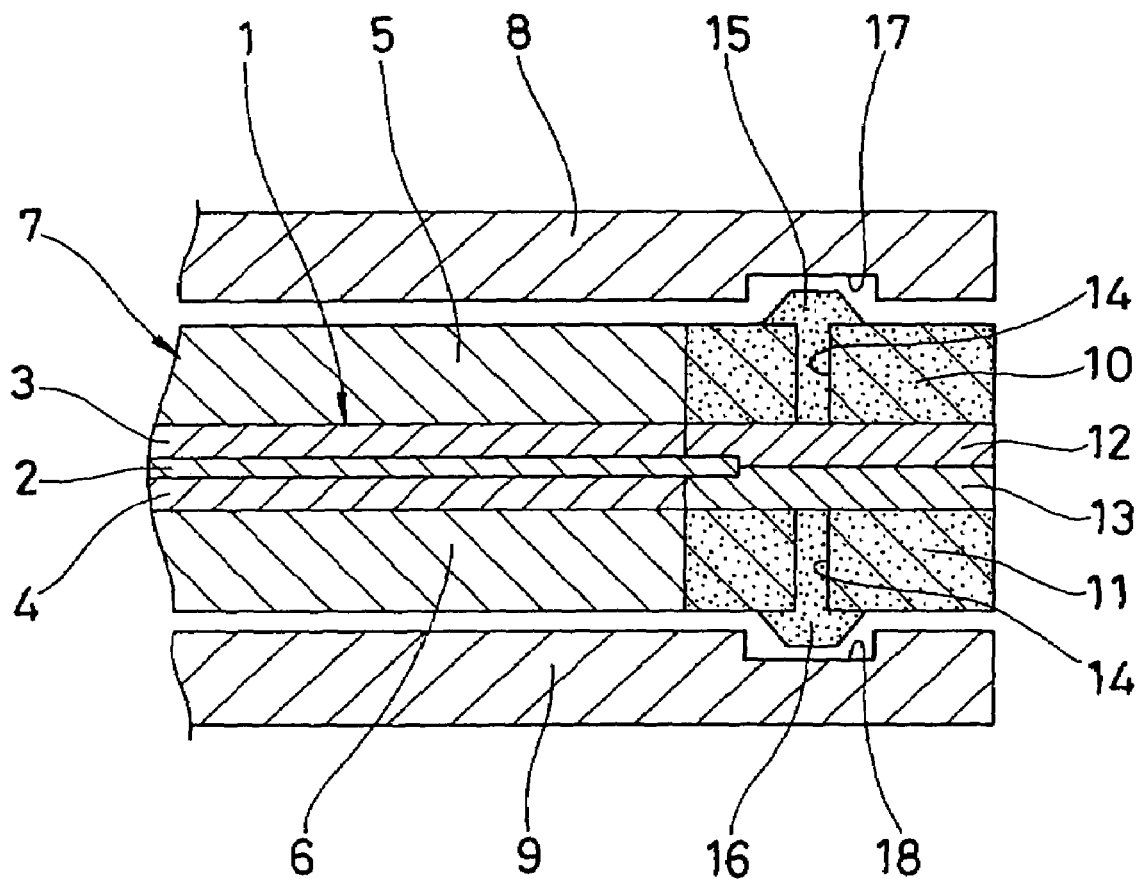
FIG. 7 is a cross sectional view of a main portion of a fuel cell in accordance with a seventh embodiment of the present invention.

FIG. 7 shows another embodiment in which the UEA is formed after the insulating spacer and the gasket are previously formed integrally. The gaskets 15 and 16 formed in the impregnation portions 10 and 11 of the gas diffusion layers 5 and 6 and the insulating spacers 12 and 13 are integrally formed respectively. The through holes 14 are opened in the gas diffusion layers 5 and 6, the insulating spacers 12 and 13 constituted by a thermoplastic resin sheet are arranged, the impregnation of the silicon rubber in the impregnation portions 10 and 11 and the forming of the gaskets 15 and 16 by the liquid silicon rubber are simultaneously carried out, and the gaskets 15 and 16 and the insulating spacers 12 and 13 are integrally formed respectively.

Eighth Embodiment

Figure 8:
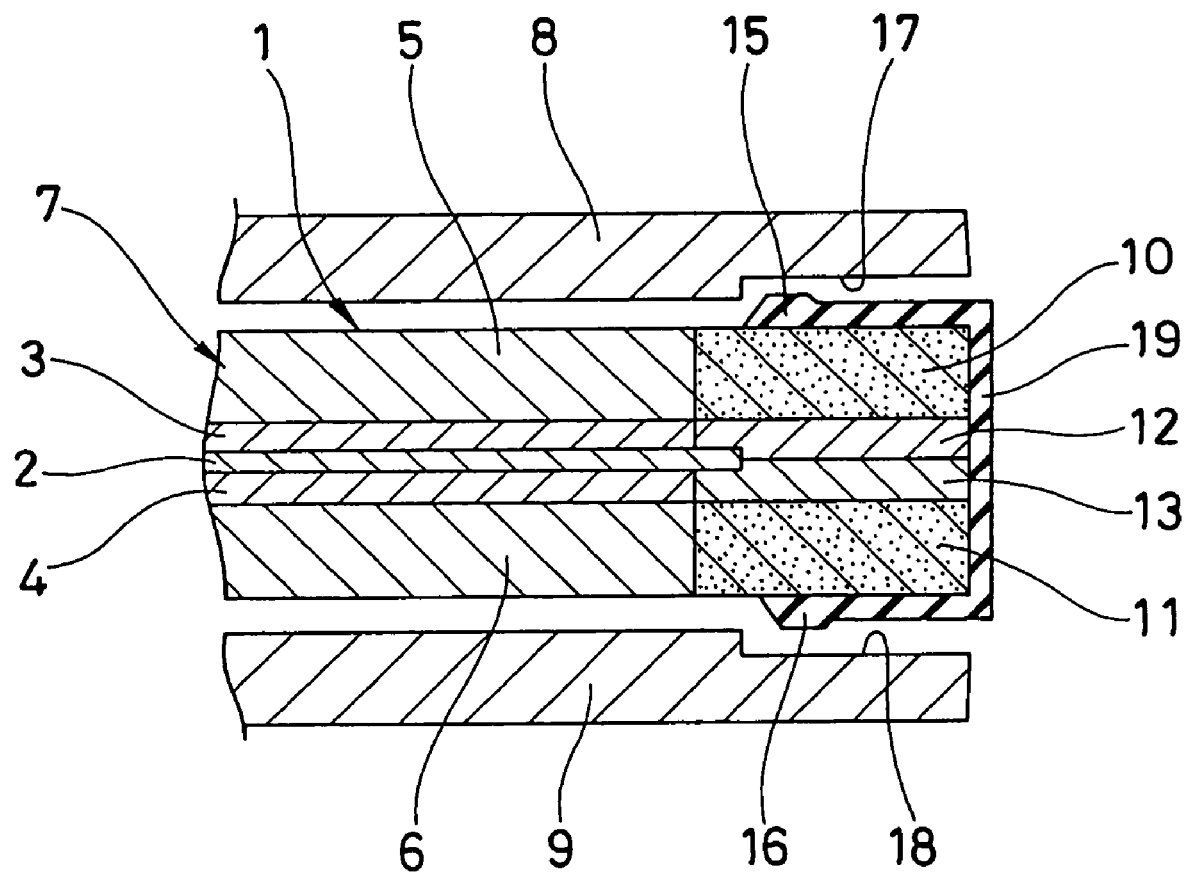
FIG. 8 is a cross sectional view of a main portion of a fuel cell in accordance with an eighth embodiment of the present invention.

FIG. 8 shows a third embodiment in which the gasket is formed after the UEA is formed by previously inserting the sheet made of the different material from that of the gasket as the insulating spacer.

That is, the catalyst layers 3 and 4 are arranged on both surfaces of the electrolyte membrane 2 so as to form the membrane electrode complex 1, the gas diffusion layers 5 and 6 are arranged on both surfaces of the membrane electrode complex 1 so as to form the UEA 7, and the separators 8 and 9 are arranged on both surfaces of the UEA 7. The gas diffusion layers 5 and 6 constituted by a porous body such as a carbon fiber or the like are structured such that the size thereof is set to be larger than the size of the catalyst layers 3 and 4, the gasket forming material is previously impregnated in a protruding portion in a plan direction, whereby the impregnation portions 10 and 11 having a comparatively low void content are formed, and the insulating spacers 12 and 13 constituted by the sheet made of the different material from that of the gaskets 15 and 16 are interposed between the impregnation portions 10 and 11. The gaskets 15 and 16 made of a rubber-like elastic material are arranged on surfaces of the impregnation portions 10 and 11 corresponding to the gasket forming portions in the gas diffusion layers 5 and 6 so as to face to the separators 8 and 9, and the gaskets 15 and 16 are integrally formed with each other via a connection portion 19 formed in an approximately C cross sectional shape. The connection portion 19 covers the end portions of the gas diffusion layers 5 and 6, and simultaneously covers the end portions of the insulating spacers 12 and 13. The stepped gasket receiving portions 17 and 18 are formed in the separator so as to correspond to the gaskets 15 and 16. The electrolyte membrane 2 is set smaller in size than the size of the gas diffusion layers 5 and 6, however, may have the size equal to the size of the gas diffusers 5 and 6.

Ninth Embodiment

Figure 9:
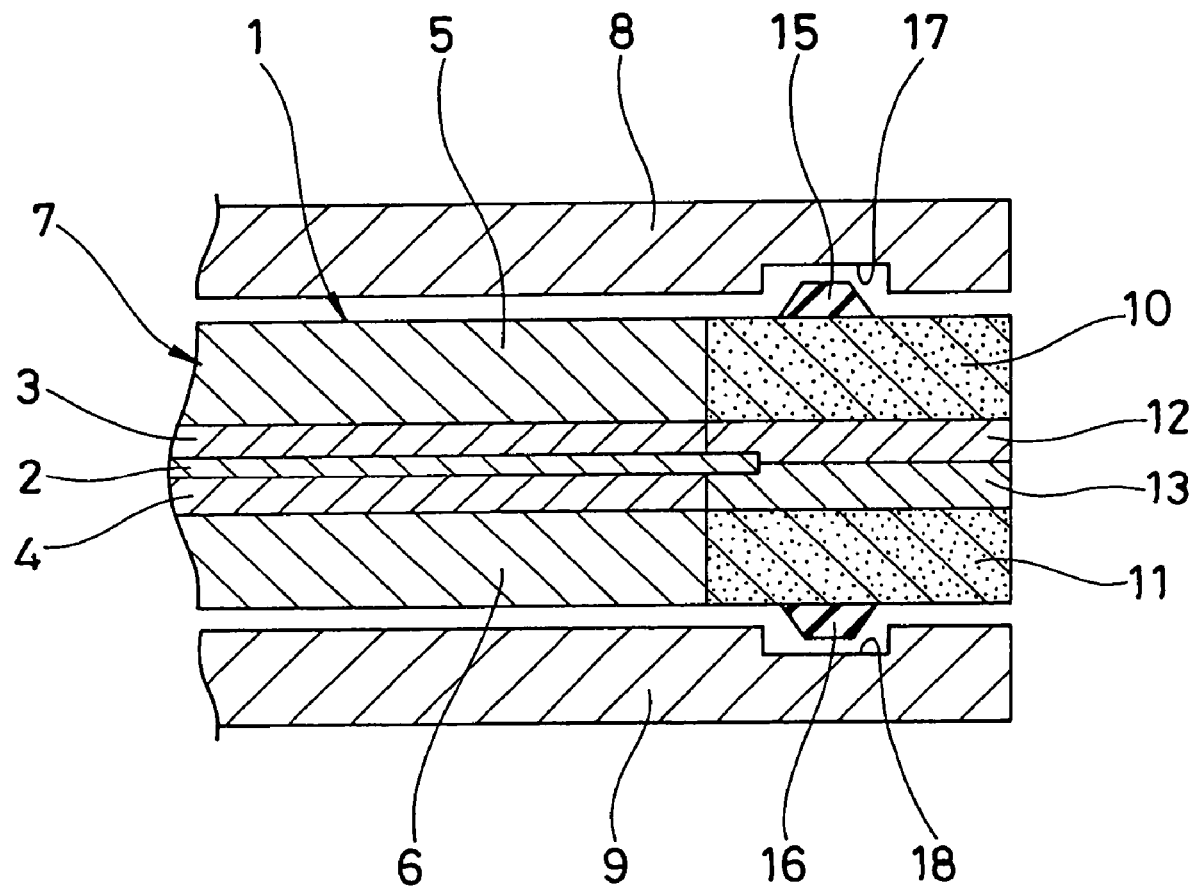
FIG. 9 is a cross sectional view of a main portion of a fuel cell in accordance with a ninth embodiment of the present invention.

FIG. 9 shows a fourth embodiment in which the gasket is formed after the UEA is formed by previously inserting the sheet made of the different material from that of the gasket as the insulating spacer.

That is, the catalyst layers 3 and 4 are arranged on both surfaces of the electrolyte membrane 2 so as to form the membrane electrode complex 1, the gas diffusion layers 5 and 6 are arranged on both surfaces of the membrane electrode complex 1 so as to form the UEA 7, and the separators 8 and 9 are arranged on both surfaces of the UEA 7. The gas diffusion layers 5 and 6 constituted by a porous body such as a carbon fiber or the like are structured such that the size thereof is set to be larger than the size of the catalyst layers 3 and 4, the gasket forming material is previously impregnated in a protruding portion in a plan direction, whereby the impregnation portions 10 and 11 having a comparatively low void content are formed, and the insulating spacers 12 and 13 constituted by the sheet made of the different material from that of the gaskets 15 and 16 are interposed between the impregnation portions 10 and 11. The gaskets 15 and 16 made of a rubber-like elastic material are arranged on surfaces of the impregnation portions 10 and 11 corresponding to the gasket forming portions in the gas diffusion layers 5 and 6 so as to face to the separators 8 and 9, and the gaskets 15 and 16 are respectively bonded to the impregnation portions 10 and 11 by an adhesive agent or the like. The groove-like gasket receiving portions 17 and 18 are formed in the separators 8 and 9 so as to correspond to the gaskets 15 and 16. The electrolyte membrane 2 is set smaller in size than the size of the gas diffusion layers 5 and 6, however, may have the size equal to the size of the gas diffusers 5 and 6.

Tenth Embodiment

Figure 10:
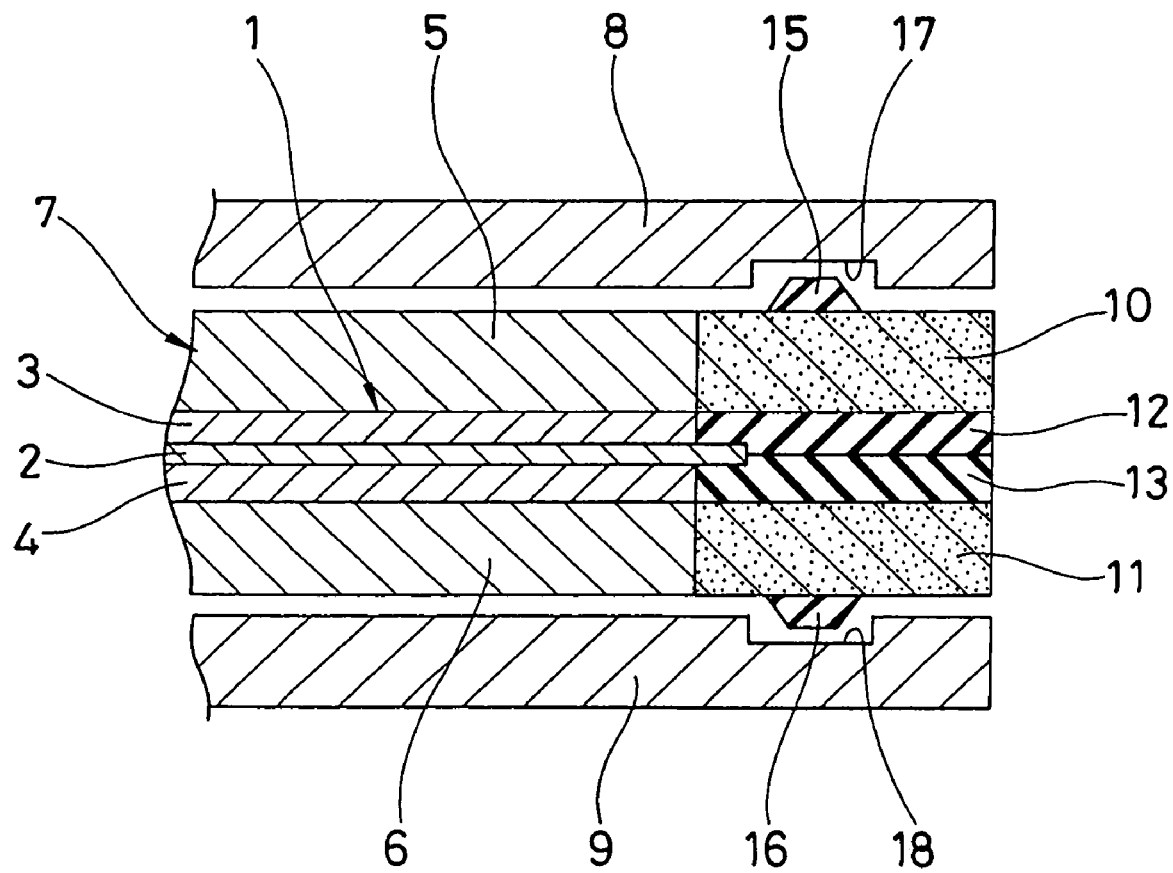
FIG. 10 is a cross sectional view of a main portion of a fuel cell in accordance with a tenth embodiment of the present invention.

FIG. 10 shows an embodiment in which the impregnation of the gasket material, the forming of the gasket and the forming of the insulating spacer are previously carried out with respect to the gasket material impregnation portion before the UEA is integrally formed.

That is, the catalyst layers 3 and 4 are arranged on both surfaces of the electrolyte membrane 2 so as to form the membrane electrode complex 1, the gas diffusion layers 5 and 6 are arranged on both surfaces of the membrane electrode complex 1 so as to form the UEA 7, and the separators 8 and 9 are arranged on both surfaces of the UEA 7. The gas diffusion layers 5 and 6 constituted by a porous body such as a carbon fiber or the like are structured such that the size thereof is set to be larger than the size of the catalyst layers 3 and 4, the gasket forming material is previously impregnated in a protruding portion in a plan direction, whereby the impregnation portions 10 and 11 having a comparatively low void content are formed, and the insulating spacers 12 and 13 made of the same kind of material as that of the gaskets 15 and 16 are interposed between the impregnation portions 10 and 11. The gaskets 15 and 16 made of a rubber-like elastic material are arranged on surfaces of the impregnation portions 10 and 11 corresponding to the gasket forming portions in the gas diffusion layers 5 and 6 so as to face to the separators 8 and 9, and the gaskets 15 and 16 are respectively bonded to the impregnation portions 10 and 11 by an adhesive agent or the like. The groove-like gasket receiving portions 17 and 18 are formed in the separators 8 and 9 so as to correspond to the gaskets 15 and 16. The electrolyte membrane 2 is set smaller in size than the size of the gas diffusion layers 5 and 6, however, may have the size equal to the size of the gas diffusers 5 and 6.

Eleventh Embodiment

Figure 11:
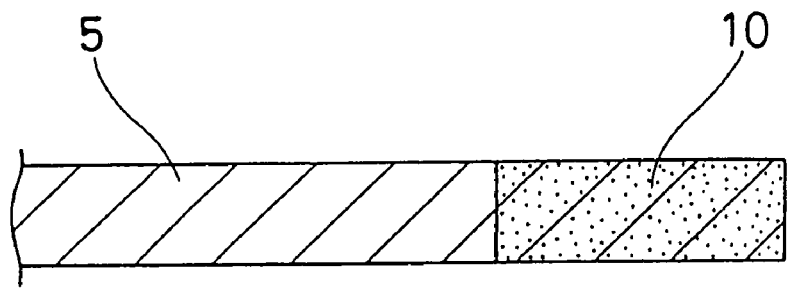
FIG. 11 is a cross sectional view of a main portion of a gas diffusion layer in accordance with an eleventh embodiment of the present invention.

FIG. 11 shows an embodiment in which a silicon rubber is impregnated in the gasket material impregnation portion of the gas diffusion layer, as a first embodiment of a single part of the gas diffusion layer. That is, the silicon rubber is impregnated in the gasket forming portion in the gas diffusion layer 5, whereby the impregnation portion 10 is formed.

Twelfth Embodiment

Figure 12:
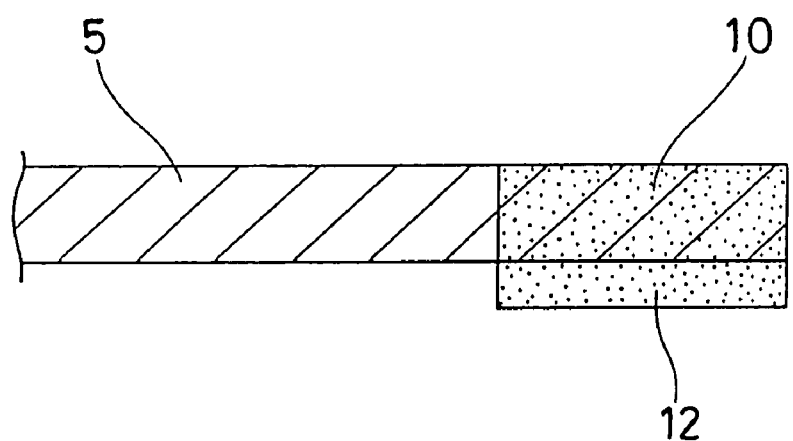
FIG. 12 is a cross sectional view of a main portion of a gas diffusion layer in accordance with a twelfth embodiment of the present invention.

FIG. 12 shows an embodiment in which a silicon rubber impregnating process in the gasket material impregnation portion of the gas diffusion layer and the silicon rubber insulating spacer forming process are integrally carried out, as a second embodiment of the single part of the gas diffusion layer. That is, the insulating spacer 12 made of the same silicon rubber is integrally formed on one surface of the impregnation portion 10, as well as the silicon rubber is impregnated in the gasket forming portion in the gas diffusion layer 5, whereby the impregnation portion 10 is formed.

Thirteenth Embodiment

Figure 13:
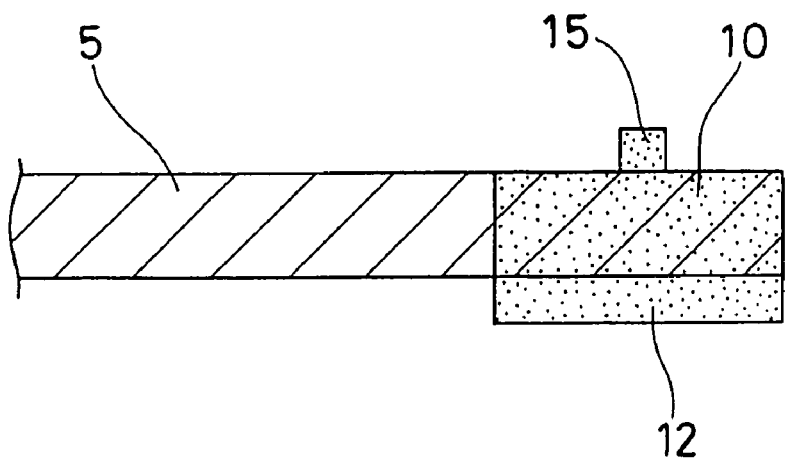
FIG. 13 is a cross sectional view of a main portion of a gas diffusion layer in accordance with a thirteenth embodiment of the present invention.

FIG. 13 shows an embodiment in which a silicon rubber impregnating process in the gasket material impregnation portion of the gas diffusion layer, the silicon rubber gasket forming process and the silicon rubber insulating spacer forming process are integrally carried out, as a third embodiment of the single part of the gas diffusion layer. That is, the insulating spacer 12 made of the same silicon rubber is integrally formed on one surface of the impregnation portion 10, and the gasket 15 made of the same silicon rubber is integrally formed on an opposite surface of the impregnation portion 10, as well as the silicon rubber is impregnated in the gasket forming portion in the gas diffusion layer 5, whereby the impregnation portion 10 is formed.

Fourteenth Embodiment

Figure 14:
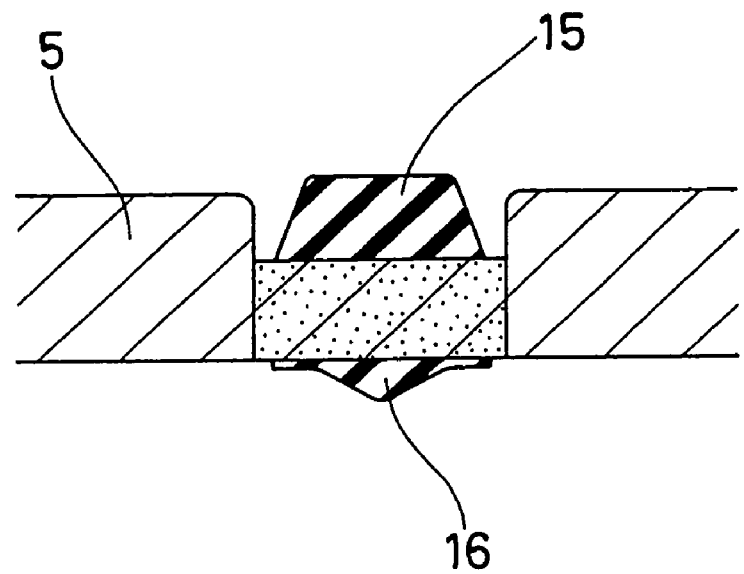
FIGS. 14A and 14B are cross sectional views of a main portion of a gas diffusion layer in accordance with a fourteenth embodiment of the present invention.
Figure 14:
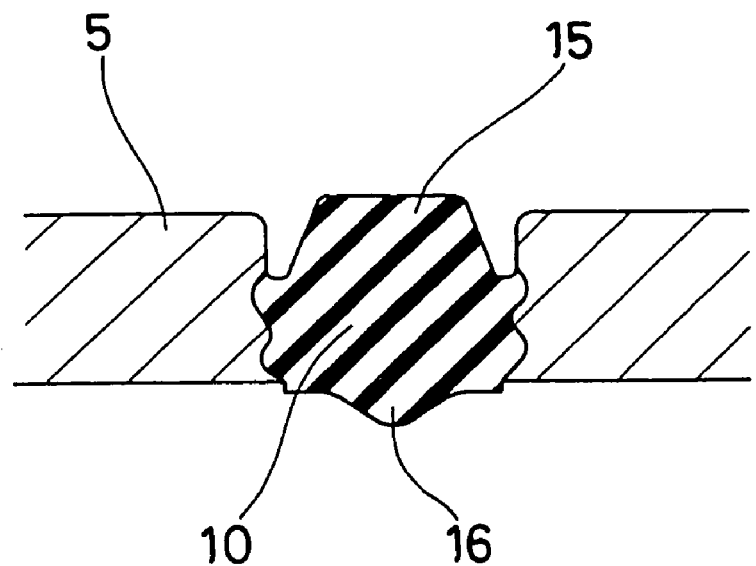

FIG. 14(A) shows an embodiment in which the gaskets 15 and 16 are formed after increasing a bulk density by compressing the gasket forming portion of the gas diffusion layer 5, as a fourth embodiment of the single part of the gas diffusion layer, and FIG. 14(B) shows an embodiment in which the bulk density is increased by compressing the gasket forming portion of the gas diffusion layer 5, and the silicon rubber impregnating process in the gasket material impregnation portion 10 and the silicon rubber gaskets 15 and 16 forming process are integrally carried out. That is, in FIG. 14(B), the gaskets 15 and 16 respectively made of the silicon rubber are integrally formed on both surfaces of the impregnation portion 10, respectively, as well as the silicon rubber is impregnated in the gasket forming portion in the gas diffusion layer 5, whereby the impregnation portion 10 is formed.

Fifteenth Embodiment

Next, a description will be given of one embodiment of a method of manufacturing the fuel cell. The method is as follows.

Figure 15:
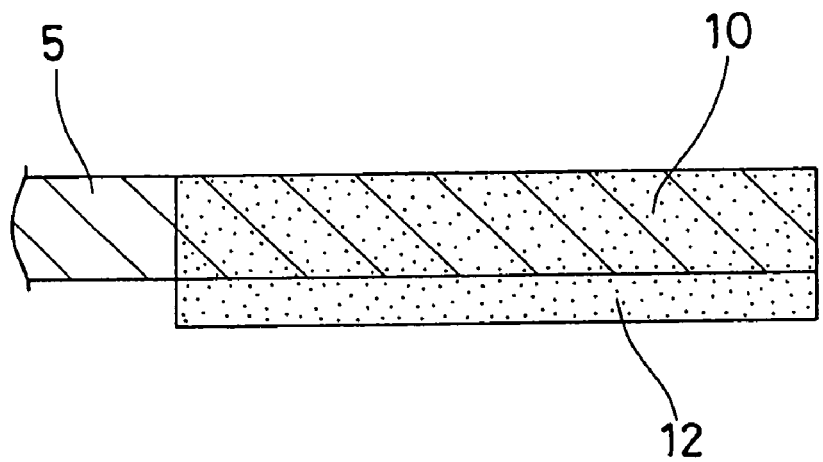
FIG. 15 is a schematic view describing a step in a method of manufacturing a fuel cell in accordance with a fifteenth embodiment of the present invention.
Figure 16:
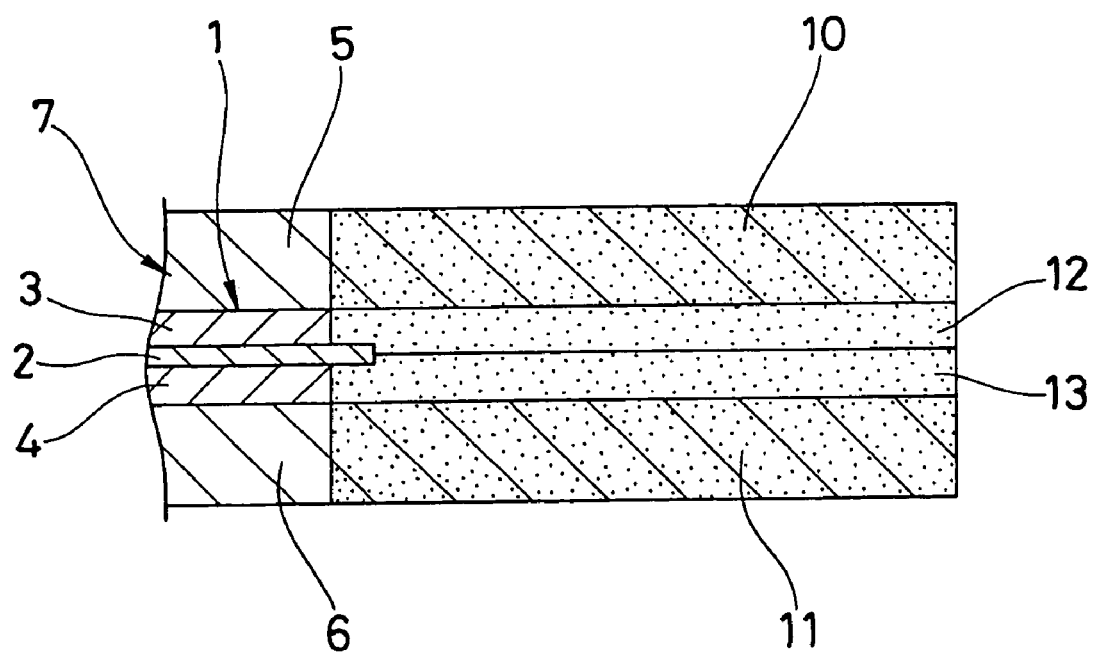
FIG. 16 is a schematic view describing the step in the method of manufacturing the fuel cell in accordance with the fifteenth embodiment of the present invention.
Figure 17:
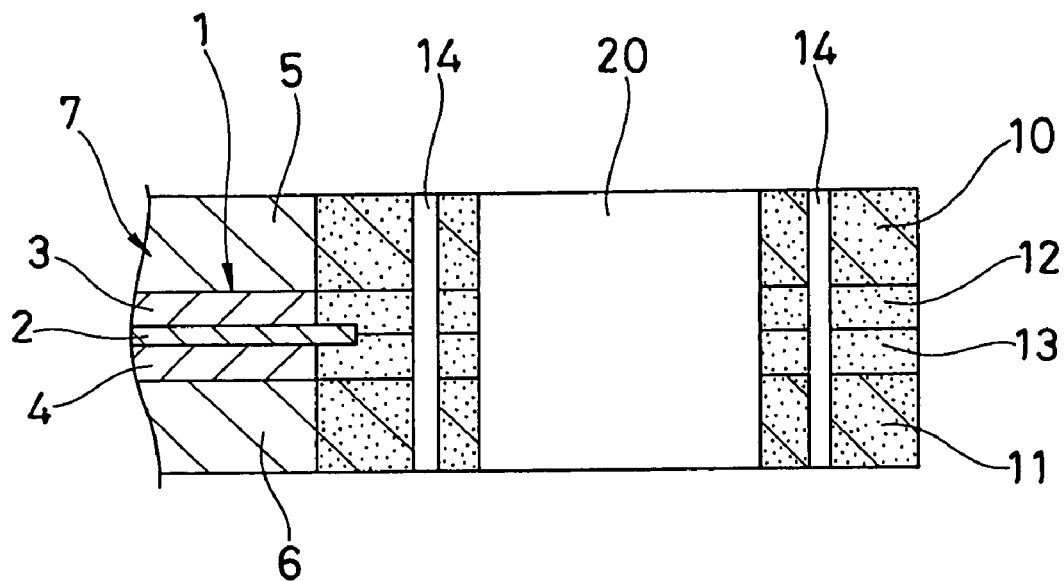
FIG. 17 is a schematic view describing the step in the method of manufacturing the fuel cell in accordance with the fifteenth embodiment of the present invention.
Figure 18:
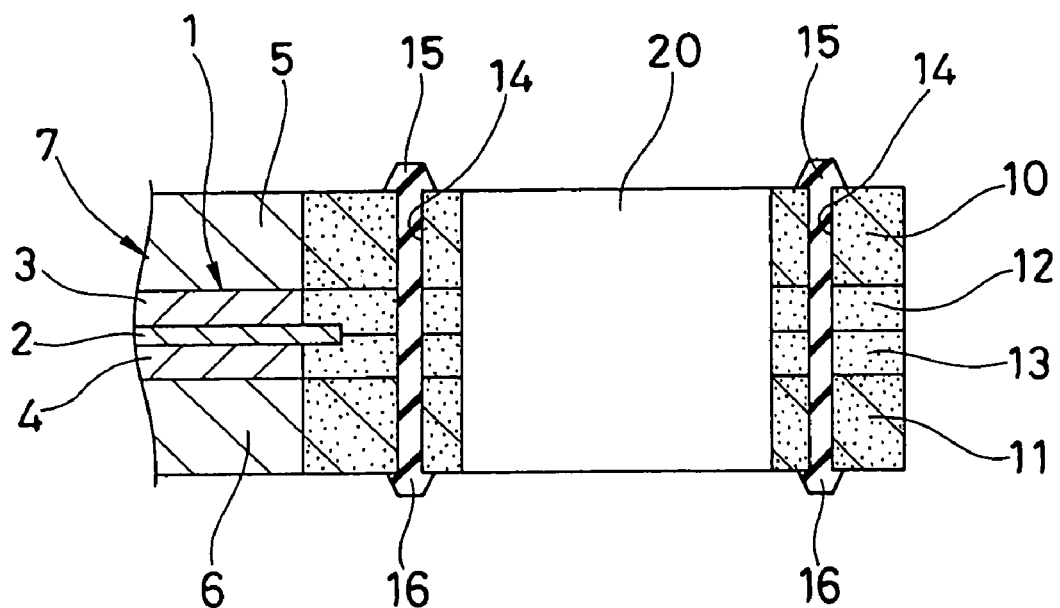
FIG. 18 is a schematic view describing the step in the method of manufacturing the fuel cell in accordance with the fifteenth embodiment of the present invention.
Figure 19:
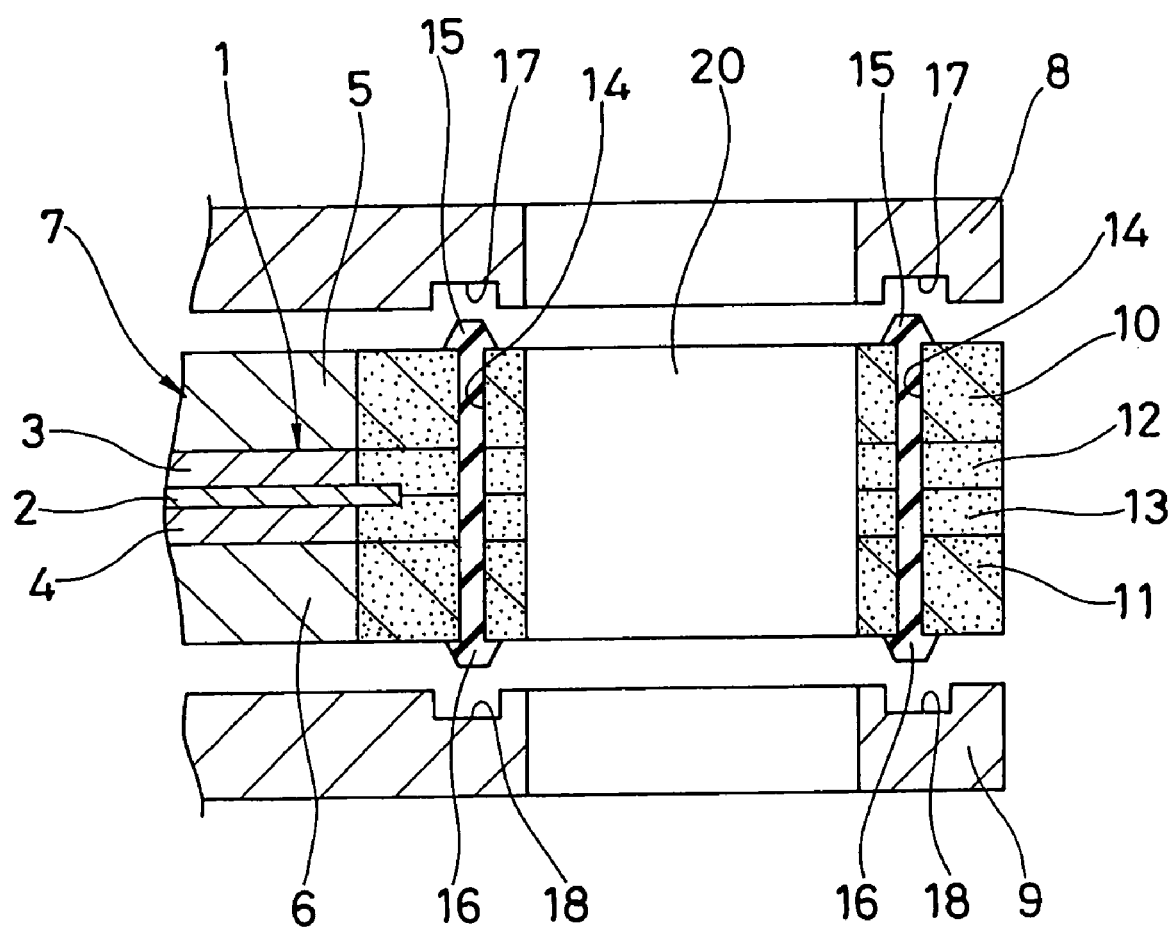
FIG. 19 is a schematic view describing the step in the method of manufacturing the fuel cell in accordance with the fifteenth embodiment of the present invention.
Figure 20:
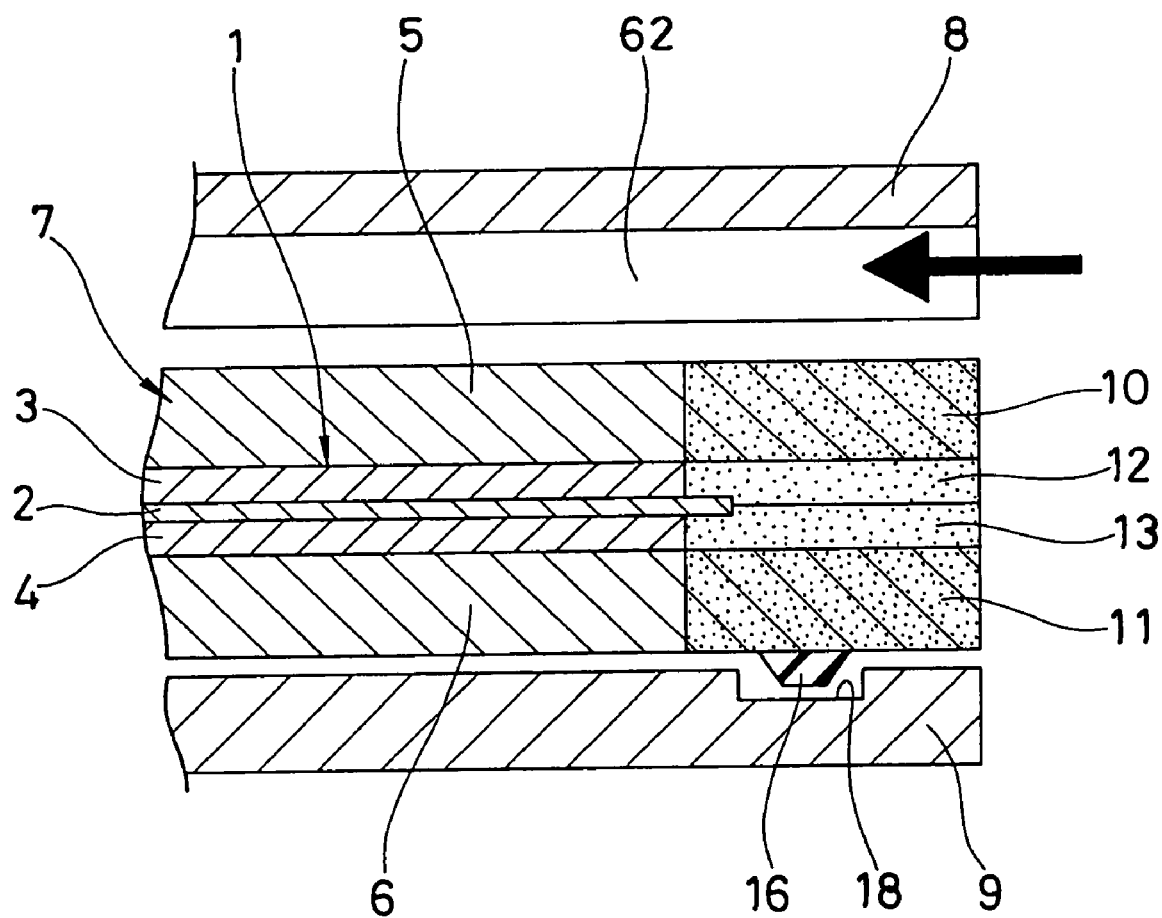
FIG. 20 is a schematic view describing the step in the method of manufacturing the fuel cell in accordance with the fifteenth embodiment of the present invention.
Figure 21:
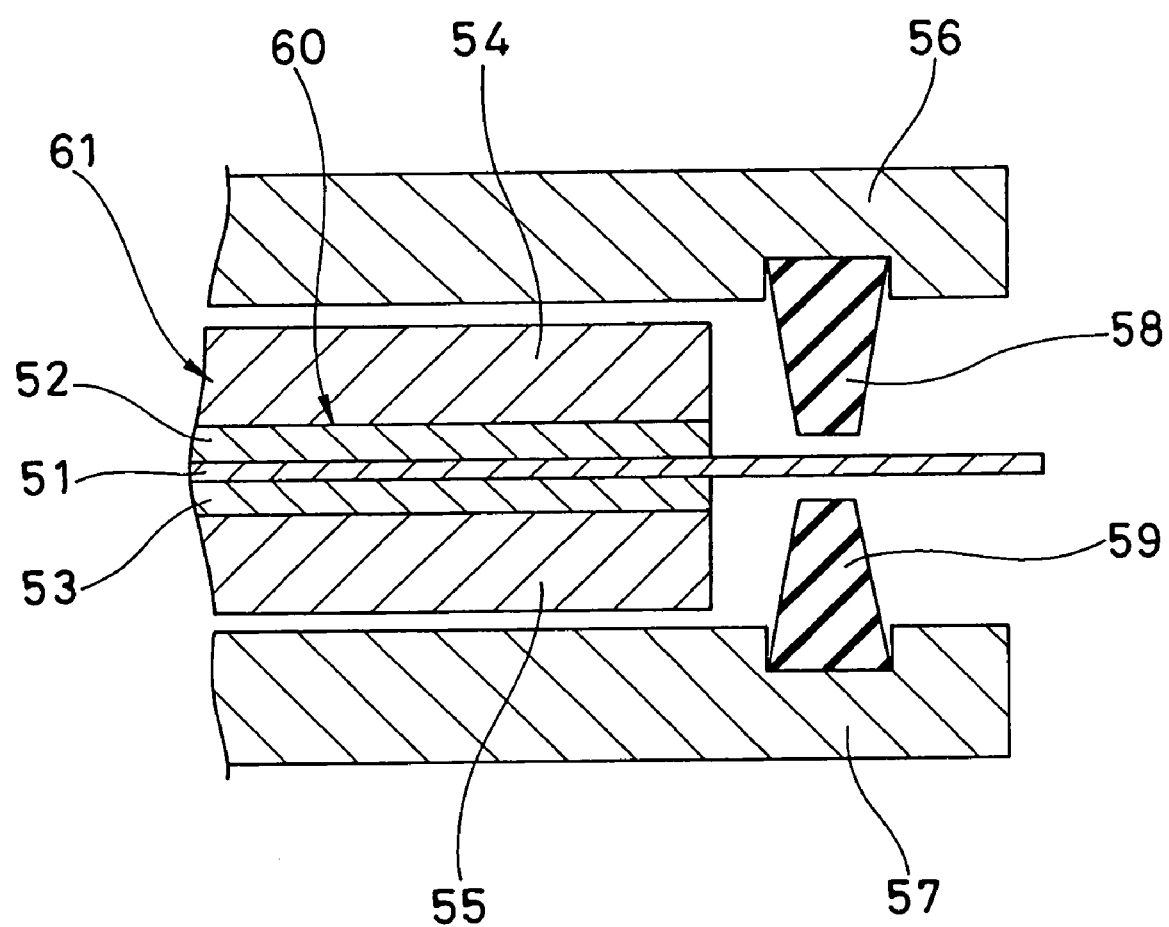
FIG. 21 is a cross sectional view of a main portion of a fuel cell in accordance with a conventional art.
Figure 22:
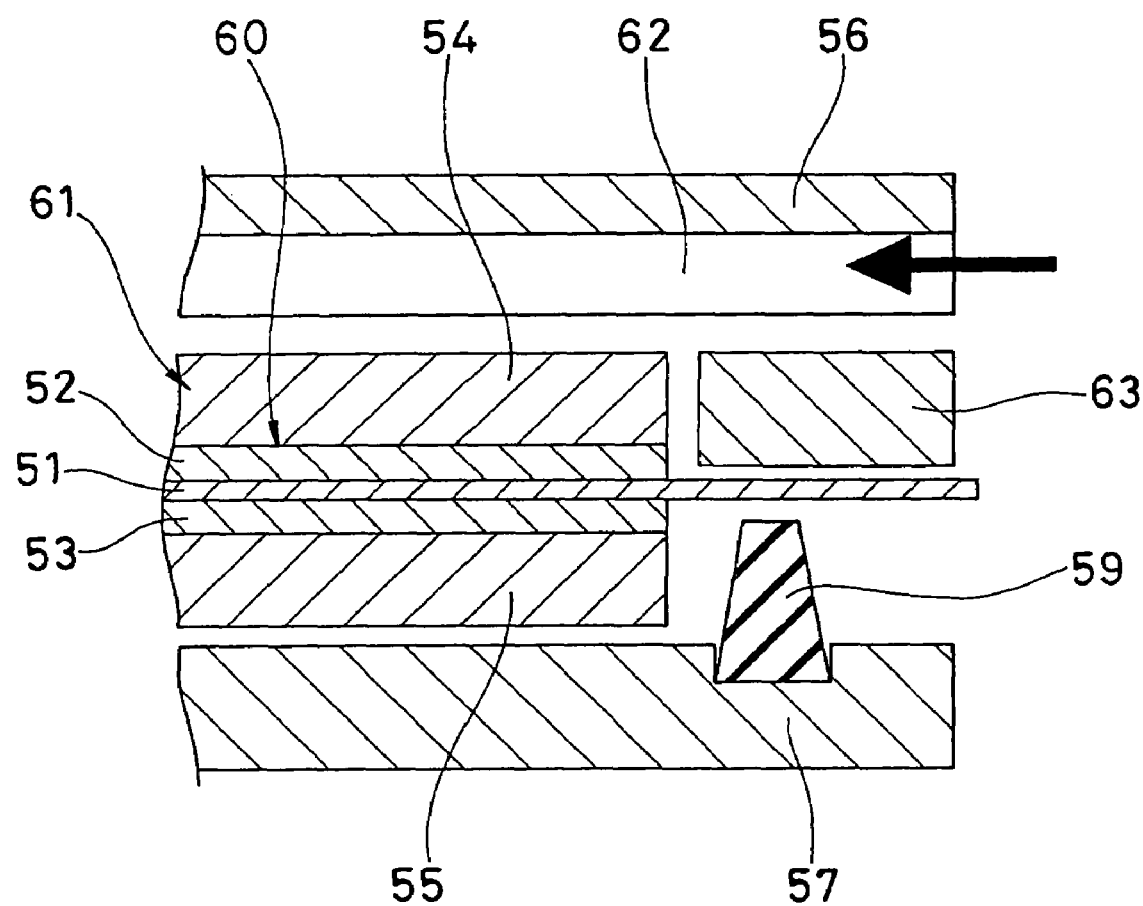
FIG. 22 is a cross sectional view of a main portion of a fuel cell in accordance with a conventional art.

That is, first, as shown in FIG. 15, in accordance with the same manner as the twelfth embodiment mentioned above, the gas diffusion layer 5 is formed by integrally carrying out the gasket material impregnating process in the gasket material impregnation portion 10 of the gas diffusion layer 5, and the gasket material insulating spacer 12 forming process, and next, as shown in FIG. 16, the UEA 7 is formed by integrally bonding the gas diffusion layers 5 and 6 to both surfaces of the membrane electrode complex 1. Next, as shown in FIG. 17, the desired number of through holes 14 and 15 and manifolds are formed so as to extend through, and next, as shown in FIG. 18, the gaskets 15 and 16 are formed, and next, as shown in FIG. 19, the stack is assembled by arranging the separators 8 and 9. FIG. 20 shows a cross sectional view including a gas introduction portion (a gas communication groove) 62 for supplying a reaction gas within a separator surface, in the cell stack in FIG. 19 which is assembled in accordance with the manufacturing method mentioned above. Since the gasket material impregnation portion 10 of the gas diffusion layer 5 is opposed to the gas communication groove 62, the spacer 63 which is conventionally required is unnecessary. Further, since it is not necessary to arrange the gasket in the gasket material impregnation portion 10 of the gas diffusion layer 5 opposing to the gas communication groove 62, the through hole is not provided.

EFFECT OF THE INVENTION AND INDUSTRIAL APPLICABILITY

The present invention achieves the following effect.

That is, first, in accordance with the fuel cell on the basis of the first aspect of the present invention provided with the structure mentioned above, it is possible to prevent the separator and the UEA from being broken due to the fastening after stacking, owing to the structure and the operation mentioned above. Further, it is possible to uniformly apply the fastening pressure to all of the gaskets, it is possible to securely obtain good seal, and it is possible to secure a safety as well as an improvement of a power generating efficiency. Further, it is possible to reduce a manufacturing cost of the gasket. Further, in a stacking step of alternately stacking the separator and the UEA, the work can be easily carried out and can be automated. Accordingly, it is possible to reduce a cost for manufacturing the stack. Further, even in the case that disassembly of the stack is required, the work can be easily carried out without breaking the structure material such as the separator, the gasket, the UEA and the like, so that it is possible to reuse and repair the structure material. Further, it is possible to obtain a good seal performance without relation to the thickness of the UEA in the gasket forming portion.

Further, in accordance with the fuel cell on the basis of the second aspect of the present invention provided with the structure mentioned above, since it is possible to easily form the gasket, the insulating spacer and the gasket material impregnation portion owing to the structure and the operation mentioned above, it is possible to reduce the cost for manufacturing the stack. Further, it is possible to easily arrange the insulating spacer in the gas diffusion layer. Further, it is possible to apply a uniform fastening force to all of the gaskets, it is possible to securely obtain a good seal, and a safety can be secured as well as an improvement of a power generating efficiency. Further, in the stacking step of alternately stacking the separator and the UEA, the work can be carried out simple and can be automated. Accordingly, it is possible to reduce the cost for manufacturing the stack. Further, even in the case that disassembly is required in the stack, it is possible to easily carry out the work without breaking the construction material such as the separator, the gasket, the UEA and the like, so that it is possible to reuse and repair the structure material.

Further, in accordance with the fuel cell on the basis of the third aspect of the present invention provided with the structure mentioned above, it is possible to prevent the separator and the UEA from being broken due to the fastening after stacking, owing to the structure and the operation mentioned above. Further, it is possible to apply a uniform fastening force to all of the gaskets, it is possible to securely obtain a good seal, and a safety can be secured as well as an improvement of a power generating efficiency. Further, it is possible to reduce the cost for manufacturing the gasket. Further, since it is possible to securely prevent the reaction gas from leaking from the end portion of the gas diffusion layer, the interface between the gas diffusion layer and the insulating spacer, or the interface between the insulating spacers, it is possible to improve the safety.

Further, in accordance with the fuel cell on the basis of the fourth aspect of the present invention provided with the structure mentioned above, it is possible to prevent the separator and the UEA from being broken due to the fastening after stacking, owing to the structure and the operation mentioned above. Further, it is possible to apply a uniform fastening force to all of the gaskets, it is possible to securely obtain a good seal, and a safety can be secured as well as an improvement of a power generating efficiency. Further, it is possible to reduce the cost for manufacturing the gasket. Further, in the stacking step of alternately stacking the separator and the UEA, the work can be carried out simply and can be automated. Accordingly, it is possible to reduce the cost for manufacturing the stack. Further, even in the case that is required in the stack, it is possible to easily carry out the work without breaking the construction material such as the separator, the gasket, the UEA and the like, so that it is possible to reuse and repair the structure material.

Further, in accordance with the manufacturing method on the basis of the fifth aspect of the present invention provided with the structure mentioned above, in the stacking step of alternately stacking the separator and the UEA, the work can be carried out simply and can be automated, owing to the structure and the operation mentioned above. Accordingly, it is possible to reduce the cost for manufacturing the stack. Further, even in the case that is required in the stack, it is possible to easily carry out the work without breaking the construction material such as the separator, the gasket, the UEA and the like, so that it is possible to reuse and repair the structure material.

Further, in accordance with the manufacturing method on the basis of the sixth aspect of the present invention provided with the structure mentioned above, in addition to the same effects as those of the third or fourth aspect mentioned above, the following effects can be obtained, owing to the structure and the operation mentioned above. That is, in the stacking step of alternately stacking the separator and the UEA, the work can be carried out simply and can be automated. Accordingly, it is possible to reduce the cost for manufacturing the stack. Further, even in the case that is required in the stack, it is possible to easily carry out the work without breaking the construction material such as the separator, the gasket, the UEA and the like, so that it is possible to reuse and repair the structure material. Further, it is possible to widely reduce the manufacturing cost at a time of mass production.

Further, in accordance with the manufacturing method on the basis of the seventh aspect of the present invention provided with the structure mentioned above, the same effects as those of the sixth aspect mentioned above can be obtained by using the adhesive rubber material, owing to the structure and the operation mentioned above.

Further, in accordance with the manufacturing method on the basis of the eighth aspect of the present invention provided with the structure mentioned above, the same effects as those of the sixth aspect mentioned above can be obtained by securing the surface roughness of the gas diffusion layer and forming the gasket thereon.

Further, in accordance with the fuel cell on the basis of the ninth aspect of the present invention provided with the structure mentioned above, in addition to the same effects as those of the first to fourth aspect mentioned above, the following effects can be obtained, owing to the structure and the operation mentioned above. That is, it is possible to easily form the gasket in the gas diffusion layer and it is possible to reduce the manufacturing cost. Further, it is possible to prevent the reaction gas from leaking from the end portion of the gas diffusion layer, and the safety can be secured as well as the improvement of the power generating efficiency.

Further, in accordance with the fuel cell on the basis of the tenth aspect of the present invention provided with the structure mentioned above, in addition to the same effects as those of the first to fourth aspect mentioned above, the following effects can be obtained, owing to the structure and the operation mentioned above. That is, it is possible to easily form the gasket in the gas diffusion layer and it is possible to reduce the manufacturing cost. Further, it is possible to prevent the reaction gas from leaking from the end portion of the gas diffusion layer, and the safety can be secured as well as the improvement of the power generating efficiency. Further, it is possible to fix the gasket to the gas diffusion layer without applying the adhesive agent to the gasket forming portion.

Further, in accordance with the fuel cell on the basis of the eleventh aspect of the present invention provided with the structure mentioned above, in addition to the same effects as those of the first to fourth aspect mentioned above, the following effects can be obtained, owing to the structure and the operation mentioned above. That is, in addition that it is possible to obtain a high gas seal performance against the gasket leak from the end portion of the gas diffusion layer, it is possible to obtain a high gas seal performance against the leak in the interface between the gas diffusion layer and the separator, so that the safety can be secured as well as the improvement of the power generating efficiency. Further, it is possible to prevent the gas diffusion layers from shorting between an anode pole and a cathode pole, at a time when the through holes are provided after integrating the UEA. Further, it is possible to prevent a compressive buckling of the end portion of the gas diffusion layer due to the stack fastening.

Further, in accordance with the gas diffusion layer on the basis of the twelfth aspect of the present invention provided with the structure mentioned above, in addition to the same effects as those of the first to fourth aspect mentioned above, the following effects can be obtained, owing to the structure and the operation mentioned above. That is, it is possible to prevent the gas diffusion layers from shorting between an anode pole and a cathode pole, at a time when the through holes are provided after integrating the UEA. Further, it is possible to prevent a compressive buckling of the end portion of the gas diffusion layer due to the stack fastening. Further, it is possible to reduce the cost for manufacturing the UEA. Further, errors in integrally bonding is reduced, and it is possible to improve a yield ratio.

Further, in accordance with the gas diffusion layer on the basis of the thirteenth aspect of the present invention provided with the structure mentioned above, the same effects as those of the first to fourth aspect mentioned above can be obtained, owing to the structure and the operation mentioned above.

Further, in accordance with the manufacturing method on the basis of the fourteenth aspect of the present invention provided with the structure mentioned above, in addition to the same effects as those of the first to fourth aspect mentioned above, it is possible to reduce the cost for manufacturing the UEA, owing to the structure and the operation mentioned above.

Further, in accordance with the fuel cell on the basis of the fifteenth aspect of the present invention provided with the structure mentioned above, the same effects as those of the first to fourth aspect mentioned above can be obtained, owing to the structure and the operation mentioned above.

Further, in accordance with the fuel cell on the basis of the sixteenth aspect of the present invention provided with the structure mentioned above, in addition to the same effects as those of the first to fourth aspect mentioned above, the following effects can be obtained, owing to the structure and the operation mentioned above. That is, since the specific positioning jig is not required at a time of alternately stacking the UEA and the separator, and it is possible to easily stack, it is possible to reduce the cost for manufacturing the stack. Further, it is possible to achieve a high seal performance, and the safety can be secured as well as the improvement of the power generating efficiency. Further, it is possible to prevent the UEA and the separator from being broken in the end portion due to a buckling deformation at a time of fastening the stack body.

Further, in accordance with the fuel cell on the basis of the seventeenth aspect of the present invention provided with the structure mentioned above, in addition to the same effects as those of the first to fourth aspect mentioned above, it is possible to reduce the cost for manufacturing the UEA, owing to the structure and the operation mentioned above.

What is claimed is:

1. A fuel cell comprising:
    a membrane electrode complex in which catalyst layers are respectively arranged on both surfaces of an electrolyte membrane;
    first and second gas diffusion layers which are arranged on both surfaces of the electrode complex;
    separators for respectively supplying reaction gas to the first and second gas diffusion layers; and
    a gasket for sealing the reaction gas,
    wherein the gasket is formed on a surface of the gas diffusion layer so as to oppose to the separator, at least the gasket forming portion of the gas diffusion layer has a lower void content than the portion which is in contact with the catalyst layer, and the gasket arranged in the first and second gas diffusion layers is connected to an insulating spacer provided on a back surface of the gas diffusion layers via a through hole provided in each of the gas diffusion layers.

2. The fuel cell as recited in claim 1, wherein the void content of the gasket forming portion is reduced by impregnating any one of rubber, resin, carbon and an inorganic material in the gasket forming portion of the gas diffusion layer.

3. The fuel cell as recited in claim 1, wherein a bulk density is made high in the gasket forming portion of the gas diffusion layer, and the void content is reduced in the gasket forming portion of the gas diffusion layer.

4. The fuel cell as recited in claim 1, wherein a gasket made of a rubber-like elastic material is formed after previously impregnating any one of rubber, resin, carbon and an inorganic material in the gasket forming portion of the gas diffusion layer, and bonding a membrane electrode complex to the first and second gas diffusion layers.

5. A gas diffusion layer for a fuel cell, the gas diffusion layer being used in the fuel cell as claimed in claim 1, wherein rubber or resin is impregnated in the gasket forming portion of the gas diffusion layer, and an insulating spacer made of rubber or resin is formed on one surface of said impregnation portion.

6. A gas diffusion layer for a fuel cell, the gas diffusion layer being used in the fuel cell as claimed in claim 1, wherein rubber or resin is impregnated in the gasket forming portion of the gas diffusion layer, and a gasket made of a rubber-like elastic material is formed at least in the gasket forming portion of the gas diffusion layer.

7. The fuel cell as claimed in claim 1, wherein the gaskets are provided at corresponding positions with respect to the membrane electrode complex, in portions in which the gaskets are formed on the surfaces of the first and second gas diffusion layers so as to face to the separator.

8. The fuel cell as claimed in claim 1, wherein a groove which receives at least the gasket is formed in the separator, the groove is shallower than the height of the said gasket, and a cross sectional area thereof is larger than a cross sectional area of the gasket.

9. The fuel cell as claimed in claim 1, wherein an outer size of the electrolyte membrane is smaller than an outer size of the gas diffusion layer, and the electrolyte membrane is arranged in an inner portion of a surface of the gas diffusion layer.

* * * * *